(12) United States Patent
Streich

(10) Patent No.: US 10,002,381 B2
(45) Date of Patent: Jun. 19, 2018

(54) METHODS, SYSTEMS AND MACHINES FOR IDENTIFYING GEOSPATIAL COMPATIBILITY BETWEEN CONSUMERS AND PROVIDERS OF GOODS OR SERVICES

(71) Applicant: Justin Streich, Winnipeg (CA)

(72) Inventor: Justin Streich, Winnipeg (CA)

(*) Notice: Subject to any disclaimer, the term of this patent is extended or adjusted under 35 U.S.C. 154(b) by 322 days.

(21) Appl. No.: 15/063,790

(22) Filed: Mar. 8, 2016

(65) Prior Publication Data

US 2016/0260162 A1  Sep. 8, 2016

Related U.S. Application Data

(62) Division of application No. 14/324,116, filed on Jul. 4, 2014, which is a division of application No.
(Continued)

(51) Int. Cl.
*G06Q 30/00* (2012.01)
*G06Q 30/06* (2012.01)
(Continued)

(52) U.S. Cl.
CPC ....... *G06Q 30/0639* (2013.01); *G06F 3/0484* (2013.01); *G06F 17/30061* (2013.01);
(Continued)

(58) Field of Classification Search
CPC ......... G06F 17/30061; G06F 17/30241; G06F 17/30522; G06F 17/3087; G06F 3/0484; G06Q 30/0639; G06Q 30/06
See application file for complete search history.

(56) References Cited

U.S. PATENT DOCUMENTS 5,948,040 A * 9/1999 DeLorme ............... G01C 21/36
340/990
5,991,739 A * 11/1999 Cupps .................... G06Q 10/08
705/26.61
(Continued)

OTHER PUBLICATIONS

2001—https://www.cs.umd.edu/~mount/Papers/crc05-prox.pdf (Year: 2001).*

*Primary Examiner* — Matthew E Zimmerman
(74) *Attorney, Agent, or Firm* — Kyle R Satterthwaite; Ryan W. Dupuis; Ade & Company Inc.

(57) ABSTRACT

Geospatial compatibility between consumers and providers of goods or services is identified. The system allows consumers to find service providers with service areas encompassing their location or merchants within a desired shopping area, and allow consumers to query about consumers within a specified area, for example to identify a potential customer base or consider regional advertising. A digital map interface allows users to enter one or more locations or areas of interest and later performs location or area additions, modifications or removals. The system provides the geospatially matched consumers and vendors with information on how to contact one another, but is kept simple by leaving actual contact between the matched parties to separate outside communication channels independent of the system. Processing requirements are reduced by pre-calculating an inner rectangle for complex polygon geographical areas so that simple point-rectangle calculations can confirm locations within the area as being within the polygon.

33 Claims, 14 Drawing Sheets

Related U.S. Application Data

12/821,508, filed on Jun. 23, 2010, now Pat. No. 8,930,245.

(51) Int. Cl.
*G06F 3/0484* (2013.01)
*G06F 17/30* (2006.01)

(52) U.S. Cl.
CPC .... *G06F 17/3087* (2013.01); *G06F 17/30241* (2013.01); *G06F 17/30522* (2013.01); *G06Q 30/06* (2013.01)

(56) References Cited

U.S. PATENT DOCUMENTS

| | | | | |
|---|---|---|---|---|
| 6,868,410 B2 * | 3/2005 | Fortin | ............... | G06F 17/30241 345/423 |
| 7,287,002 B1 * | 10/2007 | Asher | ................... | G06Q 10/08 705/26.8 |
| 7,403,939 B1 * | 7/2008 | Virdy | ................. | G06F 17/3087 707/718 |
| 2002/0007321 A1 * | 1/2002 | Burton | ................ | G06Q 10/087 705/51 |
| 2003/0008619 A1 * | 1/2003 | Werner | ................... | G01S 19/14 455/67.11 |
| 2005/0027705 A1 * | 2/2005 | Sadri | ................ | G06F 17/30241 |
| 2005/0273346 A1 * | 12/2005 | Frost | ...................... | G06Q 30/00 705/316 |
| 2009/0234775 A1 * | 9/2009 | Whitney | ............... | G06Q 30/02 705/36 R |

\* cited by examiner

Composition of a server

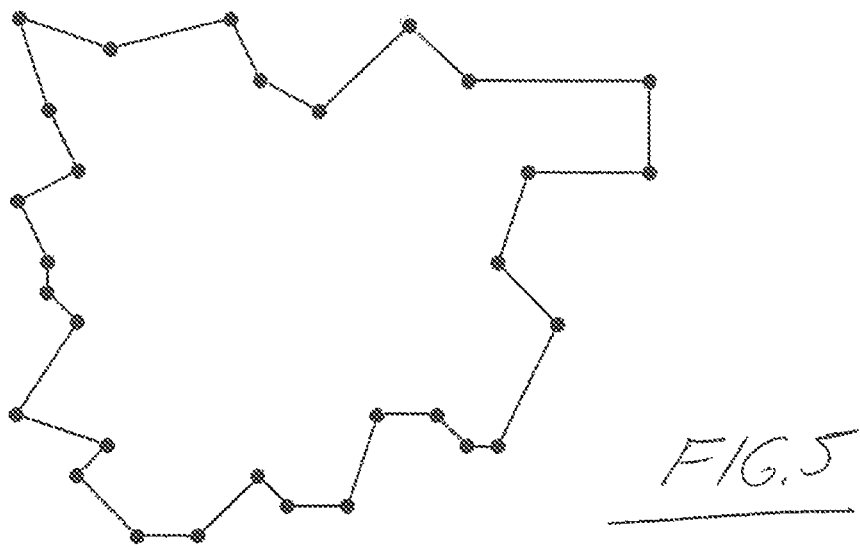
Polygon with 30 vertices (points)
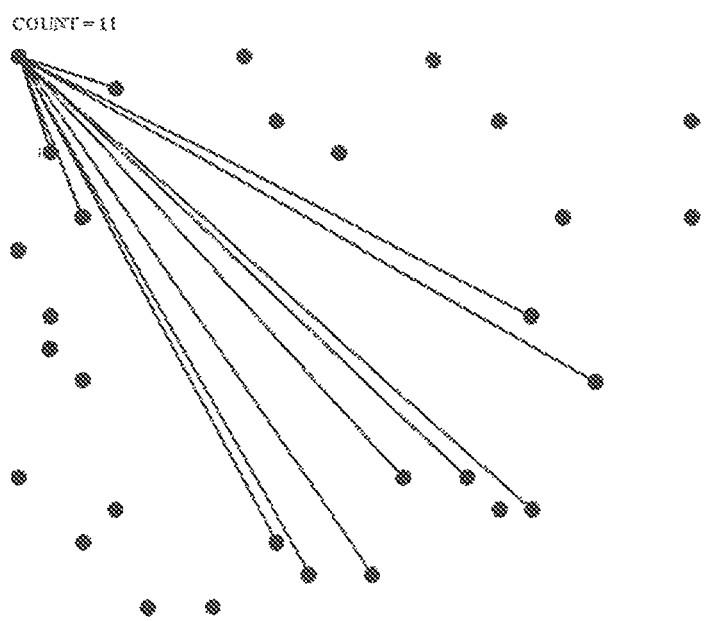

All points are equal in their line of site count

Breakout of the main database and the references to each sub database

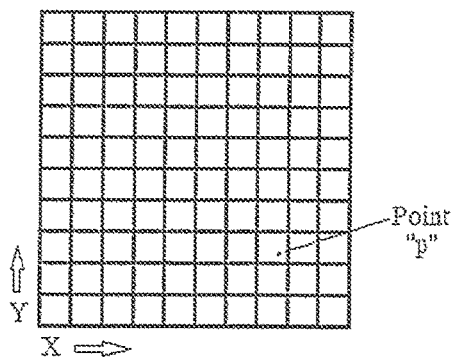
Grid #1 over point "p"
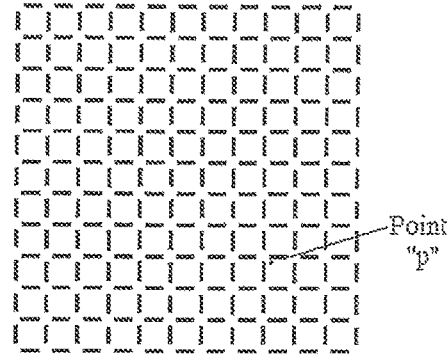
Grid #2 over point "p"
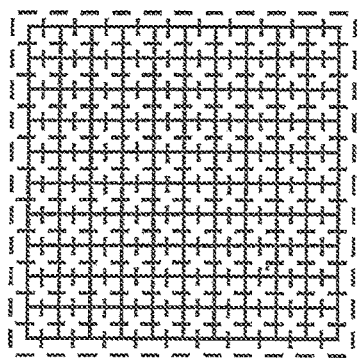
Grid #2 over grid #1 over point "p"
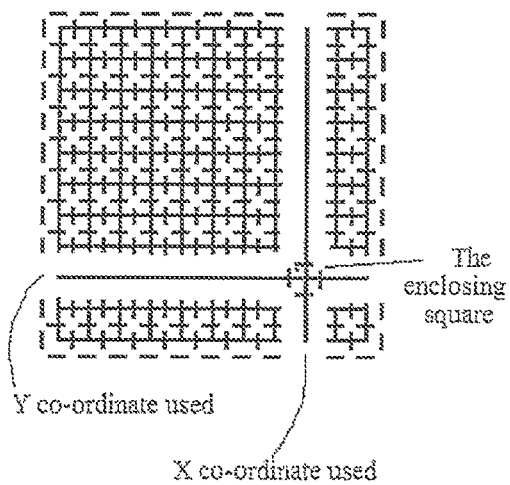
X co-ordinate used
Y co-ordinate used
The enclosing square
```
                    X = 0 0 0 1 1 0 1 1 0 1 0 1 1 0 0 0
X = 7000            Y = 1 0 1 0 0 1 0 0 0 0 0 1 0 0 0 0
Y = 42000           I = 0100011010011010001001110000000
                    Q 1 0 1 2 2 1 2 2 0 2 0 3 2 0 0 0
```
Convert X and Y to binary, create "I" then create "Q"
FIG. 22

METHODS, SYSTEMS AND MACHINES FOR IDENTIFYING GEOSPATIAL COMPATIBILITY BETWEEN CONSUMERS AND PROVIDERS OF GOODS OR SERVICES

CROSS REFERENCE TO RELATED APPLICATIONS

This application is a divisional of U.S. Non-provisional application Ser. No. 14/324,116, filed Jul. 4, 2014, which is a divisional of U.S. Non-provisional application Ser. No. 12/821,508, filed Jun. 23, 2010, each of which are incorporated herein by reference in entirety.

FIELD OF THE INVENTION

The present invention relates to tools useful by consumers to seek out service providers with a service area encompassing the consumer's location or merchants located within a consumer-specified geographical area, and by providers of goods or services to locate a potential customer base within a geographical area of interest.

BACKGROUND OF THE INVENTION

The Internet has become a vast source of information, accessible by the majority of North Americans. However, as the information available grows by an order of magnitude as time goes on, many user become bogged down in "information overload" when they attempt to use the Internet to search for specific information. In the case of local merchants and service providers, the Internet simultaneously offers more and often better choices to consumers over using traditional methods and makes those choices harder to find by the vast amount of information that must be manually combed through to determine its validity.

People using search engines to locate products and services in their community can get thousands of results even using very specific search terms. While a savvy user understands that most of the results further down the list will not be of use to them, they have to manually scan down the list and review many of the results to determine if any of them meet the criteria of what they were looking for. The user must decide if they should continue to scan or if their time would be better spend altering their search parameters. In other words, the consumer does not know if they are not finding what they want because they have not entered the proper search terms or if it is simply not there. This is further complicated because companies that design web pages are familiar with the tactics that can move their clients' web page up in the rankings of popular web search engines. This floods a consumer with a large amount of false positives that results in a lot of wasted time. In the case of local service providers, there are many sites on the Internet that allow a local service provider to advertise their service for very little money or even for free. However, the consumer is forced to once again sort through lists of "want ad" type listings to find the right service, determine if the service is available in their area and if it is at a price they are comfortable paying. Often, some of the information required is not made available unless the consumer calls the advertiser. Again, this results in hassle for the consumer and wastes time.

These processes are contrary to the modern person's desire and need to obtain the information they seek quickly and efficiently. The reason these problems exist is because the current solutions do not utilize tools that can assist the consumer to vastly narrow down their search results. Even if they did, virtually all information on the Internet does not contain the necessary infrastructure to permit these tools to be used optimally. Giving consumers and businesses access to these tools provides the means for consumers to quickly locate the business that meets their exact requirements (and just as important, inform them if nothing meets those requirements instead of listing a bunch of results that "might" meet them) and gives businesses the means to measure the markets that they work in for interest in their product or service.

The typical use of a database is to store vast amounts of information so that specific information can be queried on demand. This returns a subset of the entire database which is relevant to the person performing the query. For example, a person could query a database of employees for those only having the first name Jim. Also typical of most databases is how data is associated into records and cross indexed with separate data that is relevant to the record. Thus, the person can query for a known element (e.g., the name 'Jim') in a manner that displays all the related information associated with the records that satisfy the query in order to discover unknown information (e.g., the last names of employees named Jim).

A geospatial query (or GSQ) is a specialized search performed in a database of information where all the database records requiring searching have associations with location or geographical information, and the criterion used in the query also includes location or geographical information. The results of a geospatial query are generated by how well the spatial information supplied in the query matches the spatial information stored in the database records. For example, a user could supply a geographic location in a query of known areas in order to retrieve the records which contain an area that include the location provided.

Prior art teaches how forward and reverse geocoding can be used to determine if a geographical location (or "point") or a geographical area (or "zone") is contained within the boundaries of a polygon shape. For example, forward geocoding is used in U.S. Pat. No. 5,961,572 (Craport et al.) for determining if a point is contained in the bounds of a polygon and U.S. Pat. No. 5,978,747 (Craport et al.) for determining if a zone is contained in a polygon. U.S. Pat. No. 6,868,410 teaches a high performance method in determining if a given point or zone is contained in a polygon. U.S. Pat. No. 7,287,002 (Kothuri) teaches how that invention employs a user interface to return to a user the data associated with a polygon (or polygons) which encompass the geocoded location as described by the user.

U.S. Pat. No. 5,991,739 uses latitudinal/longitudinal coordinates to geocode customers and Vendors (Collectively, 'Users'). The reference provides an Internet Ordering Machine of customers and Vendors, attempting to partially automate certain aspects of a Vendor's day to day operation (the order taking process). This machine attempts to partially automate the ordering process of businesses by having vendors provide a product list so that customers can choose the product they wish to purchase. The machine then replaces the act of the person picking up the phone and calling the business to order by relaying what the customer chose on the web page to the business through simulated voice calls, faxes and/or emails. The transaction is an actual ordering of product from the vendor. They statically geocode users (assign one location) and do not appear to allow a user to define multiple locations. They use a grid system that progressively shrinks the resolution of an area until a single unit is of sufficient area to represent the smallest measure possible to accomplish the point a to point b calculation.

They are providing two services in a one way direction, as it is only the consumer who queries the system. The Consumer's service is ease of locating a vendor and ability to order on the spot, while the Vendor's service is the ability to obtain new business automatically. They use fax, email and voice notifications to vendors. They go so far as to have document reading and voice recognition software to interpret commands, requests and responses so that they can facilitate the partial automation of the Vendor's business, resulting in a relatively complex system.

U.S. Pat. No. 6,363,392 appears to focus on its ability to take unformatted information, extract spatial information from it and assign a "confidence" factor as to how well the extracted location would match the actual real world location, and also seems to pertain to mass uploading of information. Included is a means to use a map to adjust a location, more specifically to "correct" misinterpreted location information. Another focus is its use of spatial indexing to determine proximity. This uses a process that breaks down locations into ever smaller quadrants to determine locations and their proximity to one another. In this case, it is a method that trades pinpoint accuracy (but maintains a tolerable accuracy) for extremely fast comparisons. It also seems to be a point A to point B comparison. In summary, this patent is about taking in vast amounts of info in various stages of format. It provides a formatting, determines location and assigns an indexing system to speed up proximity search capabilities.

U.S. Pat. No. 6,571,279 teaches displaying information to a viewer based on optimizing a match between information purveyors, such as advertisers, and the viewer in a manner that is executed local to an information delivery system (column 1, line 50); the use of advanced user profiles which can be coupled with location information and information delivery systems to optimise subscriber customized information delivery to identify subscribers (column 4, line 40); that a buyer may desire to be targeted for certain mailings that describe products that are related to his or her interests, and that a seller may desire to target users who are predicted to be interested in goods and services that the seller provides (column 8, line 51); the use of a pseudonym (column 8, line 60); provision for authenticating a user's right to access particular target objects, such as target objects that are intended to be available only upon payment of a subscription fee (column 9, line 28); allowing advertisers to access a database of consumer information to gauge receptiveness to a product type and be allowed to target consumers that meet certain criteria, including the alert to a vendor of a consumer request for information, if compliant with users' privacy policies (column 16, line 8); and an example of how a business benefits for location knowledge of a consumers (column 17, lines 35-65). This is designed as a tool for giant corporate stores to profile mass numbers of consumers in order to better target advertising and marketing to locations where consumers congregate or pass through. It uses real time location information to measure congregation and predict arrival times. Information and profiles of consumers are covertly amassed through numerous online and real world means. Location information to make their invention function relies on technology that can reveal an individual's real world location. Calculations seem to be based on distance between point A and point B. They are having consumers go to vendors by getting the right advertisement or incentives into their field of view or in their hands. They allow vendors to search the accumulated data (in an anonymous way) and can send info to consumers that permit it. They state that information is stored on vendor computers and processing duties are distributed to client computers to mitigate bandwidth and processor intense activities; perhaps due to a combination of the vast amounts of information they need to deal with and the now antiquated state of computer technology at the time Aforementioned U.S. Pat. No. 5,961,572 uses the number of times a line intersects the boundaries of a shape in the determination of whether the point from which the line is drawn is inside or outside the shape in question. This patent's means of determining the location to be geocoded may be considered quite inefficient—if a provided address does not geocode, increasingly wider ranges of landmarks must be specified until a geocode can be discovered. This method is designed to discover a single point and find cycle through a list of known shapes until the correct one is found.

Aforementioned U.S. Pat. No. 6,868,410 is in essence an improvement over the previous. It claims the same method of determining a point in a shape through the "line intersects" method. However, this patent improves upon the method by using additional databases of information and using efficient indexing to allow referencing that data faster.

U.S. Pat. No. 6,701,307 appears to teach use of a map to define a location, use of a "quad key" system of indexing locations for fast searching, "spidering" documents (aka, using Google bots) on the web and creating an indexing database of captured material and creating quad keys to further tag the information, and using "location to location" as a means of deriving a search area. This usually results in a circle, but the description states "other shapes" may be used, such as common shapes like triangles, squares and rectangles.

US Patent Application Publication 2004/0133471 teaches pay for performance advertising, but appears to lack a sophisticated "geospatial query".

U.S. Pat. No. 5,978,747 deals with zone in zone comparisons, using the principles of U.S. Pat. No. 5,961,572.

US Patent Application Publication 2006/0155609 appears to simply use zip codes, area codes or other predefined areas as a means to represent geographic information.

U.S. Pat. No. 7,403,939 is a patent for returning query results based on geographic information about the requestor. "General" methods of passively acquiring geographical information (zip, area codes, IP address) are described, and an indication is made that geographic information is about a user is retrieved from an electronic store (a database) and that the query may also apply to "proprietary" data. The geographic information still applies to predefined categories like Zip, City or neighbourhoods.

U.S. Pat. No. 6,789,102 has teachings designed for use in a vehicle and deals with repositioned data terminals.

U.S. Pat. No. 7,024,250 appears to use mobile phones as a part of the apparatus, with geospatial queries executing based on location updates from mobile devices.

U.S. Pat. No. 6,546,374 teaches a process where databases are searched and clients/vendor information is exchanged so that a traditional transaction may commence. There is reference to relevant results based on "proximity.

U.S. Pat. No. 6,473,692 pertains to a more efficient way to store landmarks at a geographic location that can be easily reverted to traditional location identifiers (e.g. Latitude/longitude).

While the prior art teaches how we can query a plurality of known areas defined as polygons stored in various types of databases, it does not appear to teach dynamic addition, modification or removal of polygons by someone who is not trained in or familiar with the art. Without such an apparatus, which is provided in embodiments of the present invention, only one or more administrators (someone who is specially trained to perform advanced functions that are denied to or beyond the ability of a typical person using the invention) are required to import known polygon information. This is a problem when data associated with geographical points or zones and the points and zones themselves must be able to be added, removed, re-associated or otherwise modified simultaneously and in real time by a plurality of users. As the simultaneous user count increases, it becomes prohibitively expensive to hire, train and provide infrastructure to administrators that can affect the required changes on behalf of the users.

Prior art teaches that a point can be determined to be inside or outside of a polygon by extending an imaginary line along the x axis of the point in one direction and counting the number of times this line intersects with the boundaries of the polygon. If then number of intersections equal zero, the imaginary line is extended from the point in the opposite direction along the x axis. If this line also equals zero, then the point is not inside the polygon. If however, one of the imaginary lines does intersect with the polygon boundary, then a count totaling an even number of intersections confirms that the point is outside the polygon while a count totaling an odd number of intersections indicates the point is inside the polygon.

Prior art also teaches that when a point must be checked against a plurality of polygons, the Minimum Enclosing Rectangle (or MER) technique is used. Simply put, this is the smallest possible rectangle that could be drawn around the polygon that would contain all of the polygon's vertices. By calculating in advance the MER for each polygon, a geospatial query can first check to see if the point is enclosed inside the MER. This would in effect be a Point-in-rectangle calculation. To test for point-in-rectangle, the x and y coordinates of the point are tested against P1 (having coordinates x1, y1) and P2 (having coordinates x2, y2) coordinates, where P1 and p2 are located in opposite corners of the rectangle. A point-in rectangle calculation is true when ((x1>=x>=x2 or x2>=x>=x1) AND (y1>=y>=y2 or y2>=y>=y1)).

Clearly, a point-in-rectangle search is extremely fast in comparison to a Point-in-Polygon search. It is even faster if it is known that all the MER's use the same two points (for example, the upper right point and the lower left point) as it will be know that if x1 is always greater than x2, then there is no need to also calculate the x2>=x>=x1 portion of the calculation (the same situation applies to knowing how to calculate for y1 and y2 as well). Thus, a geospatial query will only perform the more time intense calculations on a polygon that first is found to have a MER that contains the point in question. A further advantage of the MER is that it acts as an artificial boundary when extending the imaginary line away from the point during the Point-in-Polygon calculations. In other words, the imaginary line need not extend beyond the bounds of the rectangle as by definition the polygon will not have boundaries outside of its MER.

When dealing with extremely large numbers of MER's, the prior art also teaches that a well known spatial access method called an R-Tree can be used to cluster groups of MER's in close proximity into larger MER's (called "nodes"). These larger MER's can in turn be contained in even larger MER's and so on until the highest level of nodes (known as the root nodes) are reached. Root nodes are the largest MER's in the tree and combined encompass the entire collection of MER's in the database.

Using a geospatial querying in a database that uses the R-tree structure adds a relatively small number of additional point-in-rectangle calculations in order to bypass what could be several orders of magnitudes greater number of calculations. This is because point-in-rectangle searches of the root nodes will only perform further searches on "child nodes" (the MER's that are contained within the node being searched) contained within a node that has been found to contain the point being queried. Each child node may have child nodes of their own depending how deeply nested the R-tree is. As child nodes are accessed deeper in the nested structure of the R-tree, "leaf nodes" are encountered. A leaf node contains (or points to the location of) the MER and the vertices of a polygon. The point-in-rectangle calculations performed on leaf nodes will return a result of "point not found" if none of the leaf nodes' MER's contains the point. If one or more leaf nodes' MER's are found to contain the point, then the point-in-poly calculations are used to determine which, if any of the polygons contain the point. It is not uncommon that a geospatial query may have to search along more than one "branch" (another way of describing a chain of nested nodes extending from a root node) of an R-tree. However, once all branches end in leaf nodes, the query is complete and a result of none, one or many polygons found to contain the point are returned.

When a geospatial query is only required to find a point inside a plurality of polygons that are known to be nonintersecting or inside polygons that are known to only have polygons that would overlap in a limited number of situations, the prior art is sufficient for the execution of the query. However, embodiments of the present invention permit users to create polygon boundaries that can overlap the polygons already stored in the database. As a result, an indefinite number of polygons can be defined by users that are close to, partially overlapping or completely containing (or contained by) an infinite number of other polygons previously defined.

Accordingly, there remains room for improvement in geospatial query techniques to address some of the shortcomings of the prior art.

SUMMARY OF THE INVENTION

According to a first aspect of the invention there is provided a method of identifying geospatial compatibility between consumers and providers of goods or services, the method comprising:

(a) providing a server accessible through a data network by users including first and second users who are opposite ones of a consumer and a provider of goods or services;

(b) (i) presenting a first user interface to the first user at a first electronic device operated by the first user, prompting the first user to enter a plurality of coordinate points on a digital map of the first user interface to mark vertices between lines intended to mark a boundary of a polygonal geographic area, receiving and storing data on the polygonal geographic area at the server; and (ii) presenting a second user interface to a second user at a second electronic device operated by the second user, having the second user specify a geographic location through said second user interface, and receiving and storing data on the geographic location at the server;

(c) receiving an inquiry at the server on whether, for one of the first and second users, there are other users that have polygonal geographic areas containing the geographic location of the one of the first and second users or have geographical locations within the geographic area of the one of the first and second users;

(d) in response to the inquiry, using the data on the geographic location specified by the second user and the data on the polygonal geographic area specified by the first user to have the server determine whether a coordinate point associated with the geographic location specified by the second user lies within the polygonal geographic area specified by the first user; and (e) upon successfully determining that the coordinate point associated with the geographic location lies within the polygonal geographic area, conveying data to the electronic device of the one of the first and second users that indicates that the other of the first and second users is geospatially compatible therewith.

The first user may be the provider and the second user may be the consumer, the consumer seeking a service to be provided at the geographic location and the polygonal geographic area representing a service area served by the provider. Alternatively, the first user may be the consumer and the provider may be a merchant, the consumer seeking merchandise of a desired category within the geographic area and the merchant dealing in said category of merchandise. Alternatively, first user may be the provider and the second user the consumer, the provider seeking information on a potential customer base within the polygonal geographic area.

Step (e) preferably comprises displaying to the one of the first and second users contact information of the other of the first and second users to enable contacting thereof through communication channels independent from the server. This step may involve displaying the contact information only after a certain predetermined criterion is met. The criterion may comprise one or more of payment of a fee, purchase of a membership from an operator of the method, or approval from the other of the first and second users for release of the contact information.

Step (d) preferably comprises (i) determining whether the coordinate point associated with the geographic location specified by the second user lies on or within an outer rectangle containing the vertices of the polygonal geographic area of the first user and, if so, (ii) determining whether said coordinate point lies on or within an inner rectangle contained within the polygonal geographic area, which, if so, confirms that the coordinate point is located within the polygonal geographic area.

The inner rectangle may be a largest possible rectangle contained within the polygonal geographic area.

Alternatively, the inner rectangle may be an approximation of a largest possible rectangle contained within the polygonal geographic area.

Preferably the second user interface includes a second digital map on which the geographic location specified by the second user is indicated.

Preferably the first and second user interfaces are the same.

Preferably the method includes facilitating manipulation of the vertices of the polygonal geographic area by the first user through the first user interface to enable a change in shape of the polygonal geographic area.

The manipulation of the vertices comprises adding an additional vertex or removing or relocating an existing vertex.

The method may include storing data on more than a single geographic location or geographic area for the first or second user.

The method may include storing data on at least one geographic location and at least one geographic area for each of at least one of the first and second users, wherein the server is able to receive inquiries from said at least one user on whether other users have geographic areas encompassing the geographic location of said at least one user and on whether other users have geographic locations encompassed by the geographic area of said at least one user.

Preferably the server hosts a website that presents the user interfaces upon visiting thereof by the electronic devices of the users.

According to a second aspect of the invention there is provided a method of identifying geo spatial compatibility between consumers and providers of goods or services, the method comprising:

(a) providing a server accessible through a data network by a consumer operating an electronic device connected to the data network;

(b) on the server, storing data on geographical information associated with each of a plurality of providers of goods or services, the geographical information associated with the providers comprising one or the other of geographic area or geographic location;

(c) from the electronic device of the consumer, receiving data reflective of information relevant to consumer on the other of geographic area or geographic location;

(d) receiving an inquiry at the server from the electronic device of the consumer on the existence of a provider for which the geographic location lies within the geographical area;

(e) in response to the inquiry, using the data to have the server determine whether the geographic location lies within the polygonal geographic area for each service provider; and (f) upon successfully determining that the geographic location lies within the polygonal geographic area for at least one service provider, conveying data to the electronic device of the consumer that indicates that the at least one service provider is geospatially compatible therewith and providing the consumer with access to contact information of the at least one service provider to enable the consumer to contact the service provider through communication channels independent from the server.

In some embodiments, access to the contact information may be provided only after a certain predetermined criterion is met. The criterion may comprise one or more of payment of a fee, purchase of a membership from an operator of the method, or approval from the service provider for release of the contact information.

According to a third aspect of the invention there is provided a method of identifying geospatial compatibility between consumers and providers of goods or services, the method comprising:

(a) providing a server accessible through a data network by users who include consumers and providers of goods or services and who are each presented with a user interface that is displayed on a respective electronic device and provides said each user with an option for selecting between a providing mode of the user interface and a locating mode of the user interface, (b) receiving, by the server from the respective electronic device of each one of one or more providers who have selected the providing mode, data on an offered good or service available from said each one of said one or more providers and data on a respective geographical area of interest to said each one of said one or more providers;

(c) receiving, by the server from the respective electronic device of each one of one or more consumers who have selected the locating mode, data on a desired good or service of interest to said each one of said one or more consumers and data on a respective geographical location associated with said each one of said one or more consumers;

(d) determining, by the server using the data received thereby, that the geographical location associated with at least one consumer is within the geographical area of interest to one of said providers and that the desired good or service of interest to said at least one consumer corresponds in type to the offered good or service available from said one of said providers, and transmitting, by the server, of first output data to the respective electronic device of said one of said providers to cause the providing mode of the user interface of the respective electronic device of said one of said providers to display an indication of a presence of at least one potential customer in the respective geographical area of interest of said one of said providers; and (e) determining, by the server using the data received thereby, that the desired good or service of interest to one of said consumers corresponds in type to the offered good or service available from at least one of said one or more providers, and transmitting, by the server, of second output data to the respective electronic device of said one of said consumers to cause the locating mode of the user interface of the respective electronic device of said one of the consumers to display information on said at least one of the providers.

In step (d), identifying and contact information on the at least one consumer is preferably held confidential from the provider to keep the potential customers anonymous, unless permission for release of the identifying or contact information.

Step (b) may further comprise receiving, by the server, data on a geographical location of the provider, step (c) further comprises receiving, by the server, data on a geographical shopping area specified by said each one of said consumers, and step (e) includes determining that the geographical location of said at least one of said providers is within the geographical shopping area of interest to said one of said consumers.

The geographical area of interest to said at least one of said providers may be a service area served by said at least one of said providers and the determination in step (e) includes determining that the geographical location of said one of said consumers lies within the service area of said at least one of said providers.

The geographical location associated with said each one of said consumers is preferably a location of a residence of said each one of said consumers.

According to a fourth aspect of the invention there is provided a method of identifying geo spatial compatibility between consumers and providers of goods or services, the method comprising:

(a) providing a server accessible through a data network;

(b) for first and second users who are opposite ones of a consumer and a provider of goods or services, (i) associating with the first user a plurality of coordinate points marking vertices between boundary lines of a polygonal geographic area of interest to the first user, and receiving and storing data on the polygonal geographic area at the server; and (ii) associating with the second user a coordinate point marking a geographic location of interest to the second user, and receiving and storing data on the geographic location at the server (c) receiving an inquiry at the server from an electronic device operated by one of the users on whether the geographic location of the second user lies within the geographic area of the first user;

(d) in response to the inquiry, using the data on the geographic location and the data on the polygonal geographic area to have the server perform a determination of whether a coordinate point associated with the geographic location specified by the second user lies within the polygonal geographic area specified by the first user, the determination comprising:

(i) determining whether the coordinate point marking the geographic location lies within an outer rectangle that is automatically calculated by the server and contains the vertices of the polygonal geographic area, which if not, confirms that the geographic location is outside the geographic area, (ii) if having determined that the coordinate point lies within the outer rectangle, then determining whether said coordinate point lies on or within an inner rectangle that is automatically calculated by the server and is contained within the polygonal geographic area, which if so, confirms that the coordinate point is located within the polygonal geographic area; and (iii) if having determined that the coordinate point does not lie within the inner rectangle, performing further calculations to determine whether the coordinate point is located within the polygonal geographic area;

(e) upon successfully determining in step (d)(ii) or d(iii) that the coordinate point associated with the geographic location lies within the polygonal geographic area, conveying data to the electronic device of the one of the users that indicates that the first and second users are geospatially compatible.

Step (b)(i) preferably comprises defining the inner rectangle and storing data on the inner rectangle on the server for subsequent retrieval and use of said data on the inner rectangle in step (d).

The inner rectangle may be calculated as a largest possible rectangle that fits within the polygonal geographic area.

Alternatively, the inner rectangle is calculated as an estimate of a largest possible rectangle that fits within the polygonal geographic area. In this case, the inner rectangle is preferably calculated as a largest possible rectangle that fits within the polygonal geographic area without rotation out of an orientation of the rectangle in which two pairs of parallel sides thereof parallel with respective axes of a coordinate system used to plot the geographic location and the vertices of the polygonal geographical area.

The method may include having the server determine the inner rectangle by:

selecting from the vertices of the polygonal area a group of vertices among which each vertex can have a straight line extended to each other vertex in the group without passing through boundaries of a reduced polygonal area bound by interconnection of each vertex of the group to a next vertex of the group in a sequential order according to a sequential index used to originally define a sequential order of interconnection between the vertices of the geographic area;

identifying which of the vertices of the group can have two or more rays extend therefrom in perpendicular directions corresponding to axes of a coordinate system used to plot the geographic location and the vertices of the polygonal geographical area without the rays pointing outside of the polygonal geographic area where the rays depart the vertices; and using the identified vertices to form points through which passage of lines parallel to the axes form sides of a rectangle that pass through said identified vertices through without exiting the polygonal geographic area.

Depending on the type and number of vertices identified, the determination of the inner rectangle using those vertices may vary, with some of the different possibilities being outlined as follows.

Identifying vertices of the group may comprise identifying four vertices from each of which three rays can be extended in directions not pointing outside the polygonal geographic area, and using the identified vertices comprises using each of the four vertices to define a respective side of the inner rectangle that is parallel to the axis along which two of the three rays extend from the vertex.

Identifying vertices of the group may comprise identifying two vertices which are not aligned with one another along either axis and from each of which two rays can be extended in directions not pointing outside the polygonal geographic area, and using the identified vertices may then comprise using the two vertices to define opposite corners of the inner rectangle, for which the two rays of each vertex to form two perpendicular sides of the inner rectangle extending from said vertex to where said two rays intersect the two rays from the other vertex.

Identifying vertices of the group may comprise identifying two vertices from each of which three rays can be extended in directions not pointing outside the polygonal geographic area with first rays of the two vertices extending therefrom in a positive direction along a first axis of the coordinate system, second rays of the two vertices extending therefrom in a negative direction along the first axis, and third rays of the two vertices extending in opposite directions along a second axis of the coordinate system, and
using the identified vertices may then comprise:
determining first intersection points where the first rays intersect the boundaries of the polygonal geographic area;
determining second intersection points where the second rays intersect the boundaries of the polygonal geographic area;
selecting a one of the first intersection points with a lower co-ordinate value along the first axis than the other of the first intersection points and a one of the second intersection points with a higher co-ordinate value along the first axis than the other of the second intersection points; and
defining corners of the inner rectangle at where lines parallel to the first axis and passing through the two vertices intersect lines parallel to the second axis at the higher and lower co-ordinate values along the first axis.

Identifying vertices of the group may comprise identifying two vertices from each of which three rays can be extended in directions not pointing outside the polygonal geographic area with two parallel rays of each vertex pointing in opposite directions along one axis of the co-ordinate system opposite another axis of the co-ordinate system along which the two parallel rays of the other vertex extend, and a third ray of each vertex extending in a direction perpendicular to the two parallel rays thereof and pointing toward the other vertex in said direction; and
using the identified vertices may then comprise:
determining a first intersection point where one of the two parallel rays of each vertex intersects a corresponding one of the two parallel rays of the other vertex, the first intersection point forming a first corner of the inner rectangle;
determining second and third intersection points where the other of the two parallel rays of each vertex intersects the boundaries of the polygonal geographic area;
determining a fourth intersection point where perpendicular lines extending from the second and third intersection points intersect;
determining whether the fourth intersection point lies within the polygonal geographic area, and if so, using the fourth intersection point as a second corner of the inner rectangle opposite the first corner, but if not, then determining a point of intersection between the boundaries of the polygonal geographic area and a straight line interconnecting the first and fourth intersection points and using said point of intersection as the second corner of the inner rectangle.

Identifying vertices of the group may comprise identifying two vertices from each of which two rays can be extended in directions not pointing outside the polygonal geographic area with a first ray of each vertex extending along a first axis of the co-ordinate system at a co-ordinate value along the second axis that matches the first ray of the other vertex and a second ray of each vertex extending along the second axis of the co-ordinate system in a same direction as the second ray of the other vertex; and
using the identified vertices may then comprise:
determining intersection points where the second rays of the two vertices intersect the boundaries of the polygonal geographic area;
selecting a one of the intersection points nearer to the co-ordinate value of the first rays along the first axis; and
defining three corners of the inner rectangle at the two vertices and the selected intersection point and defining a fourth corner of the inner rectangle where a line extending from the selected intersection point in a direction parallel to the first axis intersects the boundaries of the polygonal geographic area.

Identifying vertices of the group may comprise identifying three vertices from each of which three rays can be extended in directions not pointing outside the polygonal geographic area with two rays of each vertex extending therefrom in opposite parallel directions, a third ray of each vertex extending in a direction perpendicular to the two parallel rays, the two parallel rays of a first of the vertices being parallel to the two parallel rays of a second of the vertices and perpendicular to the two parallel rays of a third of the vertices, and the third rays of the first and second of the vertices extending in opposite parallel directions; and
using the identified vertices may then comprise:
determining intersection points where ones of the two parallel rays of the first and second of the vertices pointing in a same direction as the third ray of the third of the vertices intersect the boundaries of the polygonal geographic;
selecting a one of the intersection points nearer to the third of the vertices along a one of the co-ordinate axes to which the third ray of the third of the vertices is parallel; and
defining each of three sides of the inner rectangle by the two parallel rays of a respective one of the three vertices and defining a fourth side of the inner rectangle as a line extending from the selected intersection point in a direction parallel to the two parallel rays of the third of the vertices.

In other cases, the shape of the polygonal area may be such that none of the forgoing combinations of vertex types are found, in which case the method may skip the step of determining an inner rectangle and accordingly later skip step d(ii) when an inquiry is performed, and instead move directly on to step d(iii)'s alternative procedure for determining whether the geographic location is within the polygonal geographic area.

The invention also extends to systems, apparatus or machines useful in carrying out the above listed methods.

Accordingly, a fifth aspect of the invention provides a system or machine for identifying geospatial compatibility between consumers and providers of goods or services, the system or machine comprising:

at least one server computer having a processor for executing computer instructions and a memory coupled to said processor for storing instructions and data during said processing;

a communications interface coupled with the at least one computer for connecting to an external communications link or network adapted to support communication between the at least one server computer and external electronic devices remote therefrom;

a data store integral with or coupled to the at least one computer and defining a database for storing information; and a computer readable medium coupled to the processor and having executable statements and instructions thereon for execution by the processor to:
 (a) (i) present a first user interface to the first user at a first electronic device operated by the first user, prompt the first user to enter a plurality of coordinate points on a digital map of the first user interface to mark vertices between lines intended to mark a boundary of a polygonal geographic area, and receive and store data on the polygonal geographic area in the database; and
   (ii) present a second user interface to a second user at a second electronic device operated by the second user, having the second user specify a geographic location through said second user interface, and receiving and storing data on the geographic location in the database;
 (b) receive an inquiry at the server on whether, for one of the first and second users, there are other users that have polygonal geographic areas containing the geographic location of the one of the first and second users or have geographical locations within the geographic area of the one of the first and second users;
 (c) in response to the inquiry, use the data on the geographic location specified by the second user and the data on the polygonal geographic area specified by the first user to determine whether a coordinate point associated with the geographic location specified by the second user lies within the polygonal geographic area specified by the first user; and
 (d) upon successfully determining that the coordinate point associated with the geographic location lies within the polygonal geographic area, convey data to the electronic device of the one of the first and second users that indicates that the other of the first and second users is geospatially compatible therewith.

A sixth aspect of the invention provides a system or machine for identifying geospatial compatibility between consumers and providers of goods or services, the system or machine comprising:

at least one server computer having a processor for executing computer instructions and a memory coupled to said processor for storing instructions and data during said processing;

a communications interface coupled with the at least one computer for connecting to an external communications link or network adapted to support communication between the at least one server computer and external electronic devices remote therefrom;

a data store integral with or coupled to the at least one computer and defining a database for storing information, stored information in the database including data on geographical information associated with each of a plurality of providers of goods or services, the geographical information associated with the providers comprising one or the other of geographic area or geographic location; and a computer readable medium coupled to the processor and having executable statements and instructions thereon for execution by the processor to:
 (a) receive data from an electronic device of a consumer reflective of information relevant to consumer on the other of geographic area or geographic location;
 (d) receive an inquiry from the electronic device of the consumer on the existence of a provider for which the geographic location lies within the geographical area;
 (e) in response to the inquiry, use the data to determine whether the geographic location lies within the polygonal geographic area for each service provider; and
 (f) upon successfully determining that the geographic location lies within the polygonal geographic area for at least one service provider, convey data to the electronic device of the consumer that indicates that the at least one service provider is geospatially compatible therewith and provide the consumer with access to contact information of the at least one service provider to enable the consumer to contact the service provider through communication channels independent from the server.

In some embodiments, access to the contact information may be provided only after a certain predetermined criterion is met. The criterion may comprise one or more of payment of a fee, purchase of a membership from an operator of the method, or approval from the service provider for release of the contact information.

A seventh aspect of the invention provides a system for identifying geospatial compatibility between consumers and providers of goods or services, the system or machine comprising:

at least one server computer having a processor for executing computer instructions and a memory coupled to said processor for storing instructions and data during said processing;

a communications interface coupled with the at least one computer for connecting to a data network that supports communication between the at least one server computer and external electronic devices remote therefrom;

a data store integral with or coupled to the at least one computer and defining a database for storing information; and a computer readable medium coupled to the processor and having executable statements and instructions stored thereon for execution by the processor to:
 (a) for each user among a group of users who include consumers and providers of goods or services and who are each presented with a user interface that is displayed on a respective electronic device and provides said each user with an option for selecting between a providing mode of the user interface and a locating mode of the user interface, (i) receive data on an offered good or service available from each one of one or more providers who have selected the providing mode and data on a respective geographical area of interest to said each one of said one or more providers; and (ii) receive data on a desired good or service of interest to each one of one or more consumers who have selected the locating mode and data on a respective geographical location associated with said each one of said one or more consumers;

(b) determine, using the data received, whether the geographical location associated of any one of said one or more consumers is within the geographical area of interest to said each of said one more providers and whether the desired good or service of interest to said any one of said one or more consumers corresponds in type to the offered good or service available from said each one of said one more providers, and if so, transmit first output data to the respective electronic device of said each one of said one more providers to cause the providing mode of the user interface of the respective electronic device of said each one of said one or more providers to display an indication of a presence of at least one potential customer in the respective geographical area of interest to said each one of said one or more providers; and (c) determine, using the data received, whether the desired good or service of interest to said each one of said one or more consumers corresponds in type to the offered good or service available from any one of said one or more providers, and if so, transmit second output data to the respective electronic device of said each one of said one or more consumers to cause the locating mode of the user interface of the respective electronic device of said each one of said one or more consumers to display information on said any one of said one or more providers.

An eighth aspect of the invention provides a system or machine for identifying geospatial compatibility between consumers and providers of goods or services, the system or machine comprising:

at least one server computer having a processor for executing computer instructions and a memory coupled to said processor for storing instructions and data during said processing;

a communications interface coupled with the at least one computer for connecting to an external communications link or network adapted to support communication between the at least one server computer and external electronic devices remote therefrom;

a data store integral with or coupled to the at least one computer and defining a database for storing information; and a computer readable medium coupled to the processor and having executable statements and instructions thereon for execution by the processor to:

(a) for first and second users who are opposite ones of a consumer and a provider of goods or services,
  (i) receive and store data on a plurality of coordinate points associated with the first user to mark vertices between boundary lines of a polygonal geographic area of interest to the first user; and
  (ii) receive and store data on a coordinate point associated with the second user to mark a geographic area of interest to the second user;

(b) receive an inquiry at the server from an electronic device operated by one of the users on whether the geographic location of the second user lies within the geographic area of the first user;

(c) in response to the inquiry, use the data on the geographic location and the data on the polygonal geographic area to perform a determination of whether a coordinate point associated with the geographic location specified by the second user lies within the polygonal geographic area specified by the first user, the determination comprising:
  (i) determining whether the coordinate point marking the geographic location lies within an automatically calculated outer rectangle that contains the vertices of the polygonal geographic area, which if not, confirms that the geographic location is outside the geographic area,
  (ii) if having determined that the coordinate point lies within the outer rectangle, then determining whether said coordinate point lies on or within an automatically calculated inner rectangle that is contained within the polygonal geographic area, which if so, confirms that the coordinate point is located within the polygonal geographic area; and
  (iii) if having determined that the coordinate point does not lie within the inner rectangle, performing further calculations to determine whether the coordinate point is located within the polygonal geographic area;

(d) upon successfully determining in step (c)(ii) or (c)(iii) that the coordinate point associated with the geographic location lies within the polygonal geographic area, convey data to the electronic device of the one of the users that indicates that the first and second users are geospatially compatible.

According to another aspect of the invention there is provided a method of identifying geo spatial compatibility between consumers and providers of goods or services, the method comprising:

(a) providing a server accessible through a data network by users including a plurality of consumers and a plurality of providers of goods or services through respective electronic devices operated by said users;

(b) (i) for at least a first group of said users, from the respective electronic devices of said first group, which respectively prompt each user of said first group to specify a respective geographic area through said respective electronic device of said each user of said first group, receiving of data, by the server via the data network, on the respective geographic area of said each user of said first group and automatic storing of said data, by the server, on the respective geographic area of said each user of said first group; and
  (ii) for at least a second group of said users, from the respective electronic devices said second group, which respectively prompt each user of said second group to specify a respective geographic location respective electronic device of said each user of said second group, receiving of data, by the server via the data network, on the respective geographic location and automatic storing of said data, by the server, on the respective geographic area of said each user of said second group;
  (iii) for at least some users of the first and second groups, receiving of data, by the server via the data network, on both a respective geographic location and a respective geographic area from the respective electronic devices of said at least some users, and automatically storing of said data, by the server, on both said respective geographic location and said respective geographic area at the server;

(c) for said each user of step (b)(iii), performing of calculations by the server to determine whether the respective geographic location of any other users falls within the geographic area of said user of step (b)(iii) and whether the geographic location of said user of step (b)(iii) falls within the geographic area of said any other users; and through said calculations, automatically determining a first compatible group of one or more other users whose geographic locations are located within the respective geographic area of one user from step (b)(iii), and a second compatible group of one of more other users whose geographic areas contain the respective geographic location of said one user of step (b)(iii); and (d) from the server, conveying a first set of output data to the respective electronic device of said one user from step (b)(iii) to display to said one user from step (b)(iii) a first indication of geospatial compatibility of one or another of the first or second compatible group in relation, respectively, to the respective geographic area or respective geographic location of said one user from step (b)(iii);

(e) from the server, conveying a second set of output data to the respective electronic device of said one user from step (b)(iii) to display to said one user from step (b)(iii) a second indication of geospatial compatibility of the other of the first or second compatible group in relation, respectively, to the respective geographic location or respective geographic area of said one user from step (b)(iii).

Step (d) may comprise receiving, by the server, of a first request from the respective electronic device of said one user from step (b)(iii) for a first mode of output and conveying the first set of output data in response to said first request, and step (e) may comprise receiving, by the server, of a second request from said one user from step (b)(iii) for a second mode of output and conveying the second set of output data in response to said second request.

According to yet another aspect of the invention, there is provided a system for identifying geospatial compatibility between consumers and providers of goods or services, the system or machine comprising:

at least one server computer having a processor for executing computer instructions and a memory coupled to said processor for storing instructions and data during said processing;

a communications interface coupled with the at least one server computer for connecting to a data network that enables communication between the at least one server computer and external electronic devices that are respectively operated by remote users, which include a plurality of consumers and a plurality of providers of goods or services;

a data store integral with or coupled to the at least one computer and defining a database for storing information; and a computer readable medium coupled to the processor and having executable statements and instructions stored thereon for execution by the processor to:

(a) (i) for at least a first group of said remote users, from the respective electronic devices thereof, which respectively prompt each user of said first group to specify respective a geographic area, receive data on the respective geographic area via the data network and automatically store said data on the respective geographic area in the data store; and (ii) for at least a second group of said remote users, from the respective electronic devices thereof, which respectively prompt each user of said second group to specify a respective geographic location, receive data on the respective geographic location via the data network and automatically store said data on the respective geographic area in the data store;

(iii) for at least some users of the first and second groups, receive data at the server via the data network on both a respective geographic location and a respective geographic area from the respective electronic devices of said at least some users, and automatically store said data on both said respective geographic location and said respective geographic area in the data store;

(b) for said each user in step (a)(iii), perform calculations to determine whether the respective geographic location of any other users falls within the respective geographic area of said each user in step (a)(iii) and whether the geographic location of said each user in step (a)(iii) falls within the geographic area of said any other users; and through said calculations, automatically determine whether there any compatible users of a first type whose respective geographic locations are located within the respective geographic area of said each user in step (a)(iii), and whether there are any compatible users of a second type whose respective geographic areas contain the respective geographic location of said each user in step (a)(iii); and (c) subject to a positive determination of at least one compatible user of the first or second type for at least one user from step (a)(iii), conveying output data to the respective electronic device of said at least one user from step (a)(iii) to display an indication of a geospatial compatibility of each of said at least one compatible user in relation to the respective geographic area or respective geographic location of said at least one user from step (a)(iii).

According to another aspect of the invention, there is provided a method of identifying geospatial compatibility between consumers and providers of goods or services using a system comprising a server accessible through a data network by electronic devices remote from said server, the method comprising:

(a) providing access to the server through the data network by users including a set of first users each having a respective first electronic device and a set of second users each having a respective first electronic device, the first users and the second users being opposite ones of consumers and providers of goods or services;

(b) (i) obtaining, by the system, of data on a respective geographic area associated with each one of said first users;

(ii) obtaining, by the system, of data on a respective geographic location associated with each one of said second users; and (iii) obtaining, by the system, of information concerning at least one type of goods or services offered by each one of said providers of goods or services;

(c) carrying out of calculations by the system using the data on the respective geographic location associated with said each one of said second users and the data on the respective geographic area associated with said each one of said first users to automatically determine whether a coordinate point associated with the respective geographic location associated with said each one of said second users lies within the respective geographic area associated with said each one of said first users; and, through said calculations, automatically identifying at least one match in the form of a geospatially compatible pair comprising a matched one of said first users and a matched one of said second users for which the respective geographic location specified by the matched one of said second users lies within the respective geographic area specified by the matched one of said first users; and (d) based on the data on the at least one type of goods or services offered by said each one of said providers of goods or services and the geospatially compatible pair identified in step (c), generating a list of available types of goods or services by the system, and causing display of said list to the consumer by the respective electronic device of the consumer.

According to another aspect of the invention, there is provided a system for identifying geospatial compatibility between sets of first and second users, which are opposite ones of consumers and providers of goods or services, the system comprising:

at least one server computer;

electronic devices remote from said at least one server computer;

a communications interface coupled with the at least one server computer for connecting to a data network that supports communication between the at least one server computer and the electronic devices remote therefrom; and a computer readable medium coupled one or more processors of the system and having executable statements and instructions stored thereon for execution by the one or more processors to:

(a) (i) obtain data on a respective geographic area associated with each of the first users; and
   (ii) obtain data on a respective geographic location associated with each of the second users; and
   (iii) receive information concerning at least one type of goods or services offered by each one of said providers of goods or services;

(b) carry out calculations using the data on the respective geographic location associated with said each one of said second users and the data on the respective geographic area associated with said each one of said first users to automatically determine whether a coordinate point of the respective geographic location associated with said each one of said second users lies within the respective geographic area associated with said each one of said first users; and, through said calculations, automatically identify at least one match in the form of a geospatially compatible pair comprising a matched one of said first users and a matched one of said second users for which the respective geographic location associated with the matched one of said second users lies within the respective geographic area associated with the matched one of said first users; and (c) based on the data on the at least one type of goods or services offered by said each one of said providers of goods or services and the geospatially compatible pair identified in step (b), generate output data on a list of available types of goods or services, and cause display of said list to the consumer by said respective electronic device.

The disclosed invention provides a machine that imbues geo spatial characteristics into information relevant to consumers and businesses, allowing both parties to gain better access to each other in their local marketplaces. The machine uses a distributed computer interface that allows a user to connect to a central database via a device that has an Internet connection for the purpose of delivering information to or receiving information from the memory banks of the machine. The machine's user interface has built in tools that make the process of submitting or retrieving information as good or better as doing so with other methods. In the case of retrieving information, users of this machine can (a) more easily and accurately locate the specific information they seek and (b) be definitively informed that the information they are looking for is not available.

This is facilitated by the machine's Geospatial Query Engine that can exclude information that would be irrelevant to the current user due to the particular geographic properties that has been imbued into all information that is used by the machine. As a result, a user of this invention does not need to invest additional time over what is required to facilitate a traditional search, yet the results are significantly more relevant.

BRIEF DESCRIPTION OF THE DRAWINGS

In the accompanying drawings, which illustrate a exemplary embodiments of the present invention:

FIG. 5 is an illustration of a thirty point polygon representative of a geographic area being queried on the system of the present invention.

FIG. 6 illustrates a first step in calculating the approximated largest empty rectangle for the polygon of FIG. 5, which involves counting the number of straight lines that can be drawn from each vertex of the polygon to other vertices of the polygon without crossing a boundary line of the polygon.

The larger of the two is selected as the approximated largest empty rectangle for which point-in-rectangle calculations can be used to identify any geographic locations that have coordinate points inside this rectangle, which confirms that any such geographic location is within the geographic area in question without having to conduct more complex point-in-polygon calculations for that location.

Figure 13:
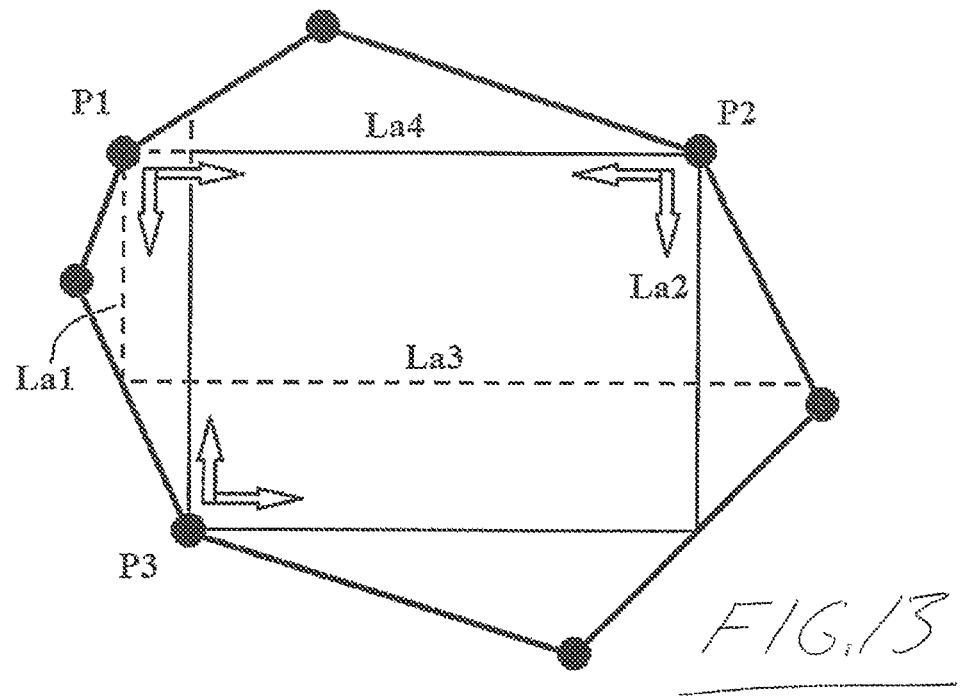

FIG. 13 shows a scenario where three prime vertices are defined in a seven point polygon that produce two different inner rectangles that will require their areas to be compared in order to determine which is the largest of the inner rectangles.

Figure 14:
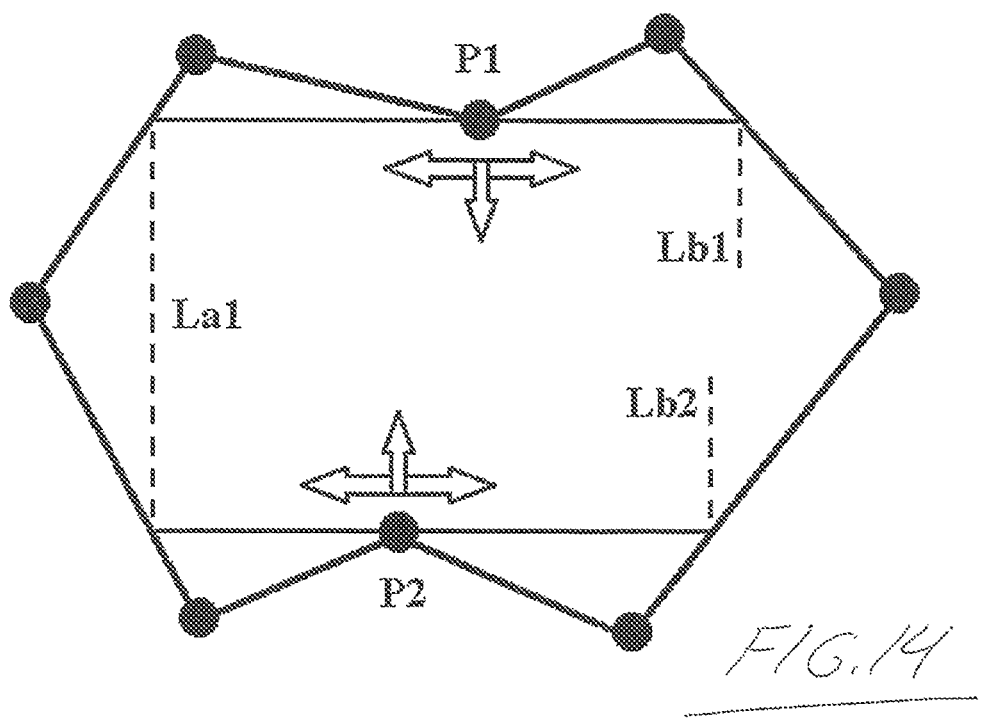

FIG. 14 shows a scenario where knowing only two prime vertices can permit the calculation of an inner rectangle.

Figure 15:
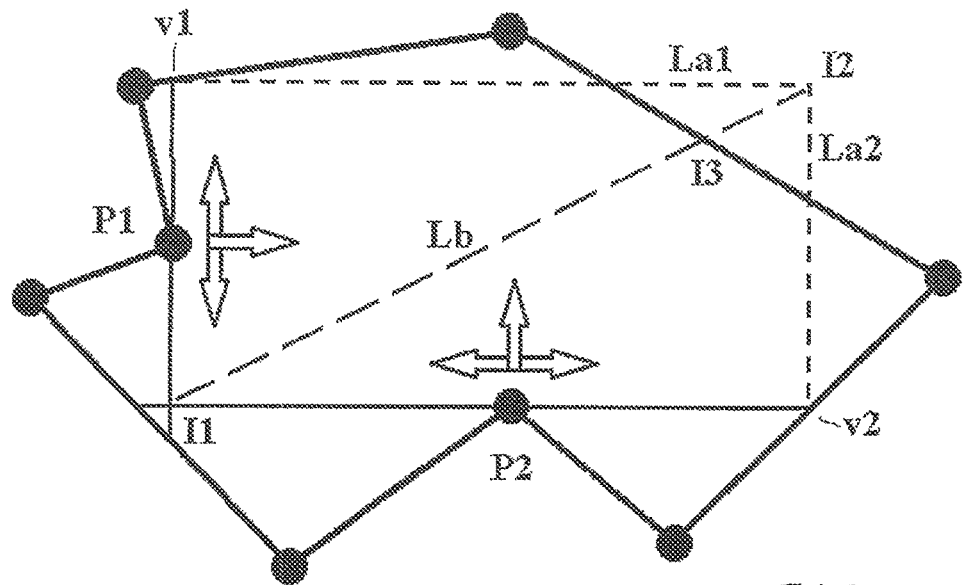

FIG. 15 shows a scenario where two known prime vertices in a configuration that differs than the scenario in FIG. 14 can still be used to determine an inner rectangle. If further illustrates the process used to take a formed rectangle created using simple calculations and ensure it conforms to the rules of a true Inner Rectangle.

Figure 16:
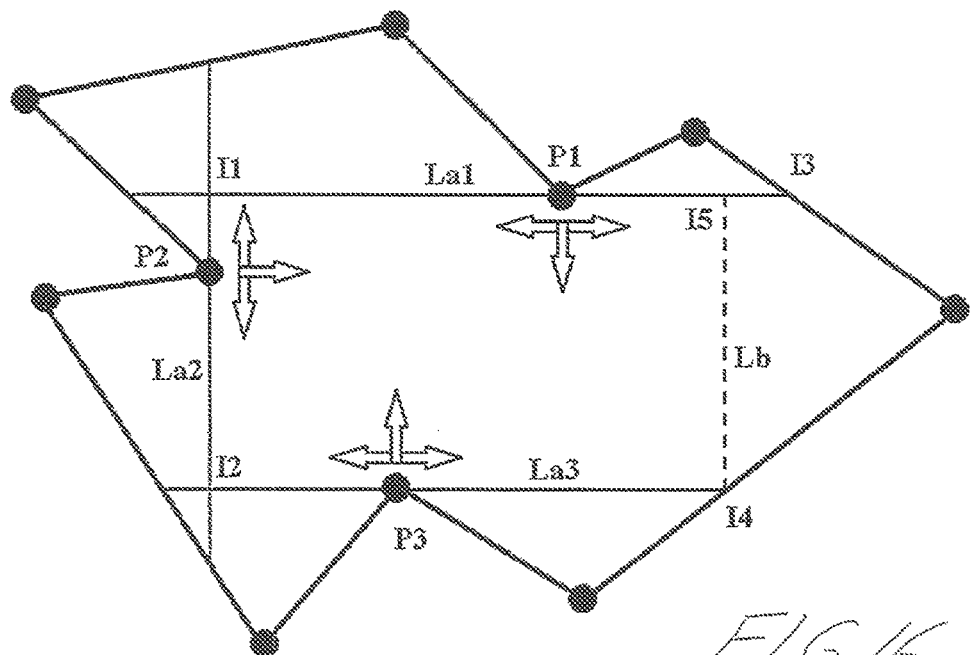

FIG. 16 shows a scenario when three known prime vertices can be used to determine an Inner Rectangle.

Figure 17:
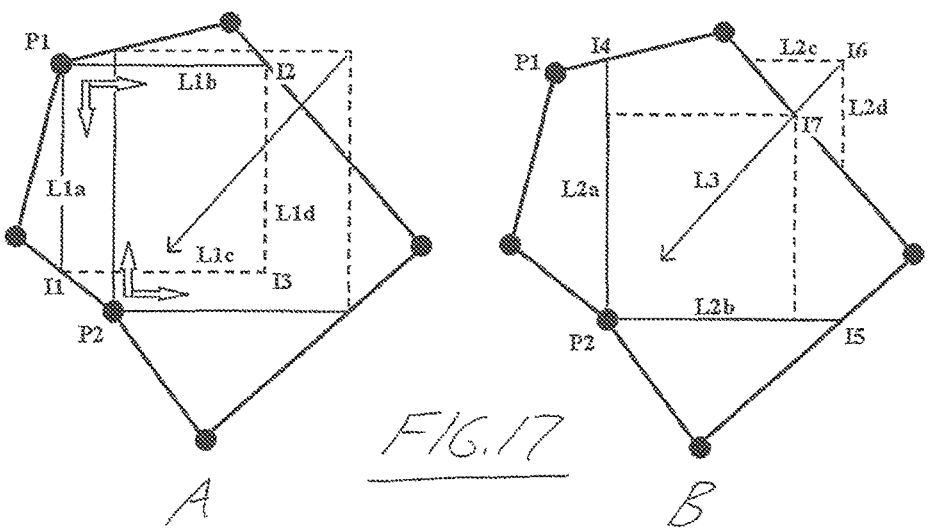

FIGS. 17a and b shows a scenario where known prime vertices cannot be used in conjunction with each other and instead must be evaluated individually. a) illustrates how each point forms its own rectangle and labels the parts of the first rectangle while b) focuses on the parts of the second rectangle and the process used to take a formed rectangle created using simple calculations and ensure it conforms to the rules of a true Inner Rectangle.

Figure 18:
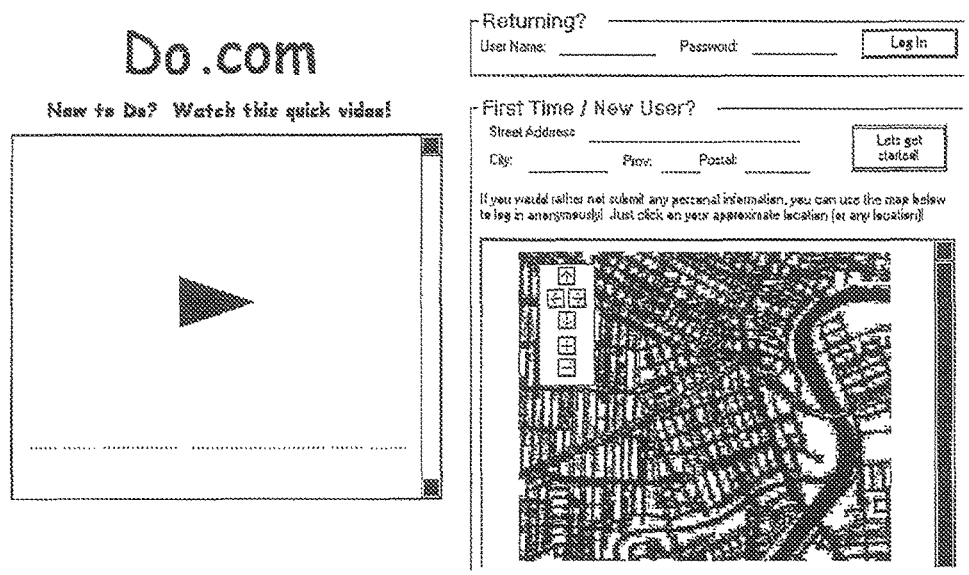

FIG. 18 shows an example of the user interface that acquires location information from new users or allows existing users to log in.

Figure 19:
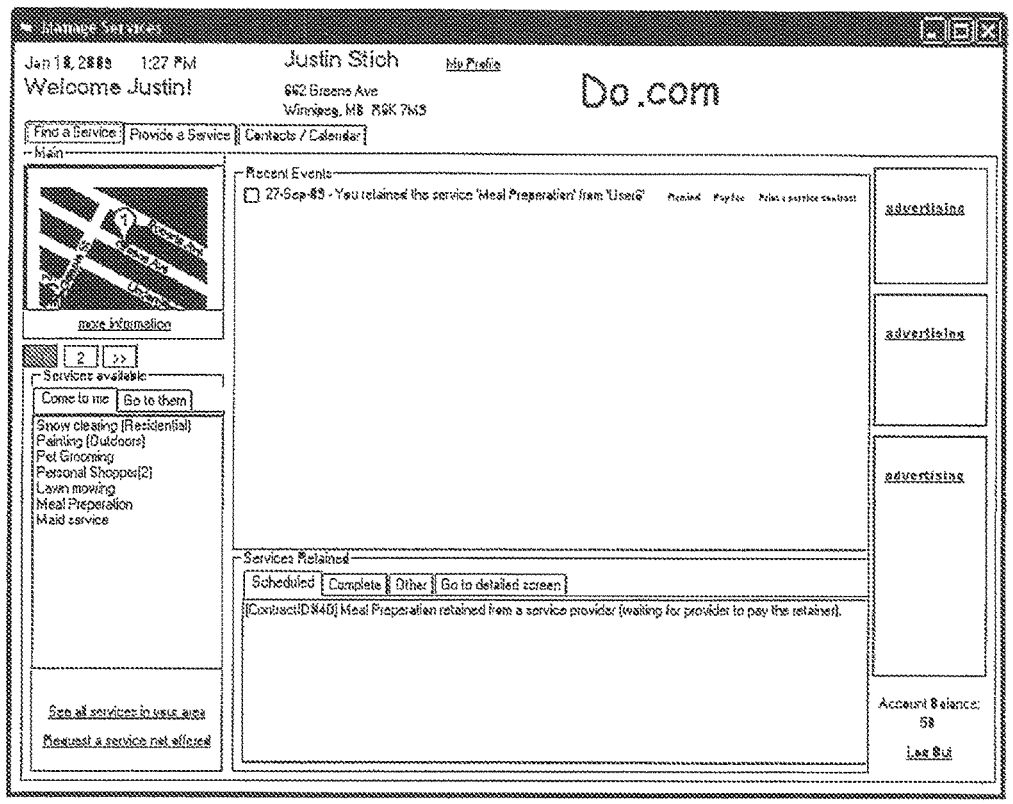

FIG. 19 shows an example of the user interface that confirms the location that a user has defined by displaying a map marked with the location, services selected for that location by the Geospatial query and other information pertaining to the user's account.

Figure 20:

FIG. 20 shows an example of the user interface where information about services the user has previously defined including a map that illustrates the custom service area as defined by the user, as well as other information pertaining to the offering of services to other users.

Figure 21:
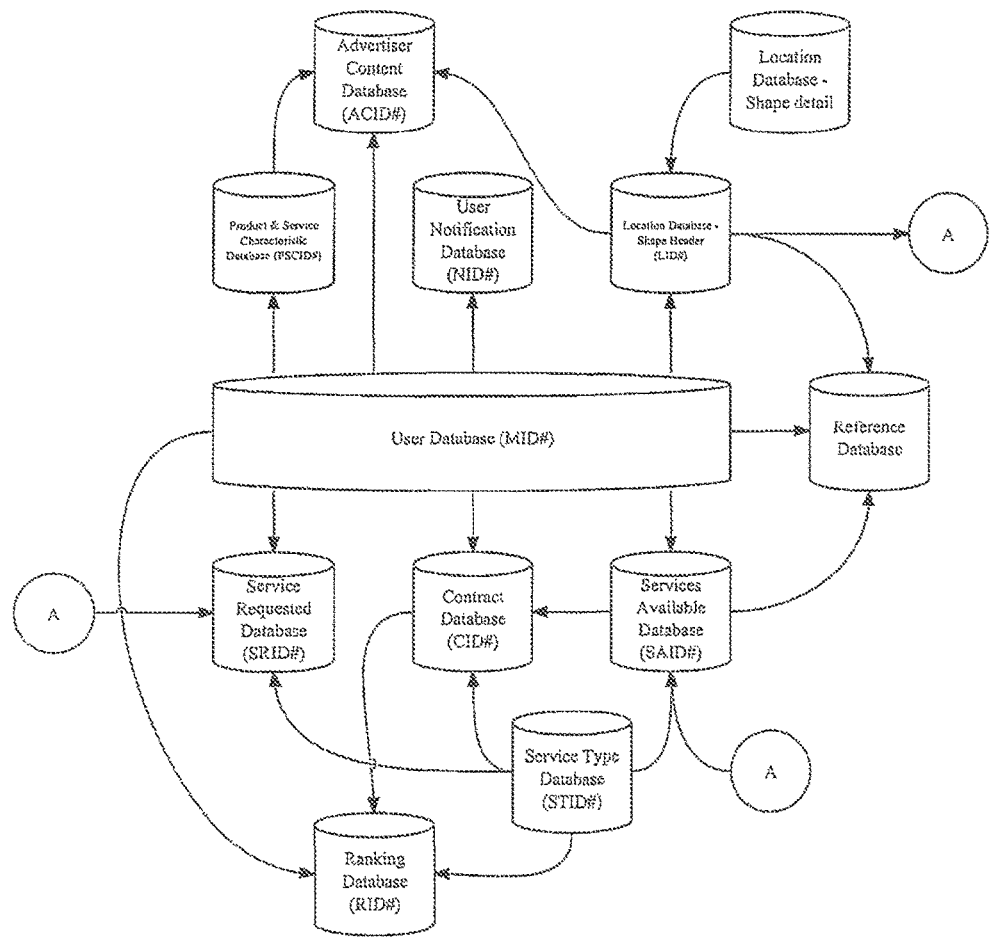

FIG. 21 shows how the database is actually broken into many sub databases and illustrates how the different parts relate to each other FIG. 22 shows how a point on a two dimensional surface can be assigned a specific X and Y coordinate based on the proximity of that point to the intersection of a grid, and then taking the co-ordinates and converting them into a Quad Key.

DETAILED DESCRIPTION

A process whereby providers of goods and services can explicitly define the area in which they are willing to travel to perform services or deliver goods by defining a polygon on a digital map. If goods or services are available at a location where consumers must physically go to in order to obtain the goods or services, a point may be defined on a digital map to disclose the location or an address may be provided which is then geocoded through an online geocoding service. A database of locations (defined as a "point" which is a geographical location defined by a latitude and longitude coordinate) and polygons shapes (which are indexed lists of points which when reconstructed in the order of the index, reproduce the original shape on a digital map by straight-line interconnection of the points in the indexed sequence) is kept and each element in this database is assigned a Master Identification Number (MID#) based on the user that created the point or shape. This "Location Database" is one of a plurality of databases (See FIG. 21) used in the process and the MID# cross references data between each database. Each element in the location database is also assigned a unique Location Identification number (LID#).

The "User Database" adds a new record which has a unique MID# each time a human user of the process attempts to access information without providing login credentials. A human user is identified as accessing data when an address is provided (and a geocoding process is used to obtain point coordinates) or a location is defined on a digital map (which defines point coordinates). A human user may voluntarily input data into a "Profile Database" such as name, address, phone number, email address and credentials (a user name and password) that can be used to identify the human user to the process at a later time. Profile data entered is referenced with the MID#.

A digital map is provided for users to define additional points or shapes pertaining to locations or areas that they wish to define. A point is created by moving a mouse pointer or other movable cursor to the location on the digital map and clicking a button on the mouse to define the location. FIG. 18 illustrates components of such an interface including a map where the user is able to interact with to define points and shapes as well as fields to enter text to describe locations. A shape is defined by clicking or selecting a series of points on the digital map so that each point can be indexed in the order it is clicked. Each individual element, be it a point or a shape, is stored in the "Location Database" where it is assigned a unique LID# and is also referenced with the MID# of the human user that defined the location or shape.

A "Service Type Database" stores types of services that are available within the process, each identified with Service Type Identification numbers (STID#). Only a specific type of user defined as an "Administrator" may add or remove elements in this database. A "Services Available Database" stores records that consist of a user (defined as MID#) that offer a service type (defined by the STID#) within an area as defined by a shape or at a location defined as a point (referenced by the LID#) and is assigned a unique Service Available Identification number (SAID#). Each SAID# is cross referenced with additional information input into the Service Available database by a human user that describes additional details of the service that the human user provides beyond its category type. This information includes but is not limited to text, images, video and other media files in addition to links, shortcuts or addresses that permit connections to other sources of information.

An "Advertisers Content Database" stores the location of digital files stored on the hard drives utilized by the process and text that is displayed on a users screen or used to navigate a user's web browser and each element is assigned a unique Advertisers Content Identification number (ACID#). Human users may upload digital files (such as PDF documents) and digital images stored as a file (such as a JPEG file) to the processes' hard drives and these files will be assigned a unique ACID#. Text for use in displaying to other users and text that will be decoded by a web browser as a web address (URL) can be entered into the Advertisers content database and each text entry is assigned a unique ACID#.

A "Product and Service Characteristic Database" stores the details of products and services that can be advertised on the site. Each element is assigned a Product and Service Characteristic Identification number (PSCID#), references the MID# of the user that created the profile and has a setting that can flag the profile as preferences for finding products or services to consume rather than to advertise. The Process will recognize a human user's MID# and reference it against a PSCID# flagged for consuming. If this situation exists, then the advertising panels in the user interface while the current user is using the system will be populated by advertisements that have similar characteristics referenced by the PSCID#.

An "Advertisers Database" stores records consisting of a user (defined as a MID#), a location defined as a point (referenced by the LID#), elements of Advertisers content (referenced by the ACID#) and characteristics of what is being advertised (referenced by a PSCID# not flagged as a consuming profile). The user interface of the process contains predefined areas called "Advertising Panels" (see FIG. 19 and FIG. 20) and while a User interfaces with the process, these advertising panels will display text and images as referenced by the ACID# in a record selected by the process in the Advertisers Database. If a user interacts with an advertising panel by moving the mouse pointer in the predefined area and clicking the mouse button, the process will reference the text that translates into a web address (if a referenced ACID# provides this information) and use it to open a new window in the users web browser which will navigate to this web address; or a user's interaction with an advertising panel will open a digital file (if a referenced ACID# provides the location of a file on the process' hard drives) or email this file to the user's email address (if an email address is associated with the user's MID# and the user has authorized this by applying settings which are stored in the User Database), or both (if an ACID# is present for both processes), the file being a digital document that contains promotional material that the advertiser wishes to convey to consumers. In some cases, the digital document may be hosted on a server outside of the process. In this case, a referenced ACID# provides a link to the digital document which is accessed via the interconnected network.

A user can access the user interface through a computer that is connected to the process' server through a local area network, or a wide area network such as the Internet. The "Server" is a single computer or a plurality of computers that each contains at least one or more hard drives (which stores the entire contents of the process' databases), Random Access Memory (where smaller parts of the process' database is copied to so that a user may observed or modify the data), at least one Network Connection Interface (which facilitates the connection of the Server to the User's computer) and at least one central processing unit (that facilitates the movement and manipulation of data to and from the Hard drive and RAM and the network connection). The program containing the instructions and statements executed by the processor to carry out the process of the invention is stored on the memory of the hard drives or other computer readable medium coupled to the processor. The user interface is preferably presented on an internet website hosted by the server and accessible by both the consumer and provider users. As further alternatives to any of a variety of desktop, laptop or personal computer, other electronic devices capable of exchanging data over the data communications network linked to the server may be employed by users to interact with process. Examples of such devices presenting an electronic display screen for presenting a suitable user interface may include personal digital assistants (PDAs), tablet computers and mobile cellular telephones. While the examples presented herein for navigation and control in the user interface make reference to use of a computer mouse for interaction with the interface, it will be appreciated that other control types may alternatively be used. For example, track balls or touch pads are known computer peripherals for controlling an on-screen cursor or pointer and actions taken in association with on-screen elements to over which the cursor is positioned. Touch screen controls may likewise be used to interact with elements of the user interface, and like the touch pad may employ the user's fingertip or a stylus for motion, and possibly action, control.

The "User Interface" is displayed on the monitor or display screen of the User's computer or other electronic device when the user accesses the Process' Server, and is broken up in to numerous main sections which include "Login", "Service Locating", "Service Providing", "Marketplace", "Map and Location", "Ranking Area" and "Profile". With reference to FIG. 18, the "Login" interface is initially provided when a user initiates a connection to the Server and remainder of the user interface withheld from the User. Login provides an interface to permit credentials to be entered (so that a returning user may resume a previous session) or to provide information which will result in the definition of a location. Providing a location will allow a user to interact with certain other elements of the user interface while entering credentials (a user name and password) allows interaction with all elements of the user interface unless certain interactions have been disabled in the users' profile. Login also provides instructional and/or tutorial content to assist users on how to use the interface.

"Profile" is available to all users after "logging in" (providing a location or a user name and password in the Login user interface) and may be accessed from numerous other sections of the user interface. The profile displays the content of records stored in the "User Database" associated with the same MID# and permits this information to be viewed or modified by the user. This information includes personal information about the user, how the user is permitted to use the Process, how the process may use information provided by the User and how information provided by other users can be displayed to the User. The disabling of elements of the user interface may be done by the users themselves as a convenience or by the administrators of the Process as a means of control. Administrators may disable aspects of the process for a single user, many users or all users. Once disabled, the element can be set to remain disabled for a defined time or until an administrator enables it himself or herself or grants the ability for a user to enable it.

With reference to FIG. 19, the "Service Locating" interface is a section of the user interface available for display after logging in. There is an area that displays messages or alerts that the Process or other users intend for the current user to receive. The service available interface is generated by populating areas with data selected from the "Services Available Database" and the "User Notification Database". The User Notification Database stores messages by indexing all messages with a Notification Identification Number (NID#) and references the MID# for the user it is intended for. The user is displayed a customized list of services that are available at the user's expressed location or are within the user's define traveling range (if the user must go to the service provider to receive the service) as well as all messages intended for that user (unless the user has previously indicated not to show the message after viewing it in a previous session). Since a user may have multiple locations defined, the interface uses the last defined or selected user location. The interface permits cycling through all locations with an LID# that is associated with the User's MID The custom service list is generated using a "Geospatial Query" (GQ) which will filter out data associated with locations that do not fall within a defined shape. The GQ will filter out all services with service areas that do not encompass the location of the user (where the service provider must travel to the user) and will filter out services or goods that are not encompassed by the users defined shape or radius (where the user must travel to that location). The User's defined shape or radius is an element defined in the user's profile. The GQ process can be conducted on demand, for example to generate a new services available list if the user expresses a new location. In this case, the service list in the User Interface is momentarily disabled while available services are populated dynamically (or alternatively, the list is left active but is cleared and refreshed with the new list of services and there will be an indication as to when the list is complete). The Process can use the GQ to build a "Reference Database" that associates LID# and SAID# in advance so that a less process intensive can be used to display available services on demand.

With reference to FIG. 20, the "Service Providing" interface can only be accessed by a user that has logged in with a user name and password or is a new user that has defined a user name and password in the Profile area. Displayed in the Service Providing interface is a list of other users that have contacted the user to provide services for them and a list of services that the user currently offers. These lists are populated based on the MID# of the user and will reference the "Contract Database" to generate the list of other users and the "Services Available" database for the list of services offered. An "Offer new Service" area is an interface that allows the user to produce a new entry in the Services available database which is where users can populate the Services Available database with the services they wish to provide. Users can also search a "Services Requested" database using a defined shape to determine what services are in demand in that defined area.

The "Map and location" interface is modular and can stand alone as a user interface within the Process or act as a sub section of another section of the user interface. A digital map is displayed along with a list of shapes and locations. The list is populated by referencing the Location Database for any LID# that is cross referenced with the user's MID#. The user may select an existing location or shape from the list which will mark the location (indicated by an icon) or plot the shape (indicated by a series of lines that close to make a polygon) on the map. The user may modify a location or shape by editing what appears on the map by moving the mouse pointer a location, and intersecting point in a shape (called a "Vertex") or over a line in the shape and hold down the mouse button. In the event a location or vertex is selected, the user may move the mouse pointer which will move the location or vertex along with the mouse pointer until the user releases the mouse button. At which point, the location or vertex is assigned to that new location of the map. If a user selects a line in a shape, a new vertex is created at the exact location where the line is selected and this vertex can now be moved as described when an existing vertex is selected. Vertexes may also be deleted, which will cause the shape to be re-plotted with the remaining vertices assigned to it.

A new location or shape can be requested which permits the user to click the map or enter an address to define a location, or plot a shape on the map. Shape plotting is accomplished by either defining multiple locations on the map which will result in a "connect the dots" method or defining a single location will plot a square shape around the location that the user can then manipulate using the editing techniques described earlier. A new shape or location must be issued a label by the user and all information is saved in the "Location Database". All shape and location editing occurs by holding the information about the shape or location in RAM while the user perfects the result. The user must indicate through the user interface that the shape or location is to be made permanent, at which time the information that defines the location of shape is stored in the Location Database and assigned a new LID# (if it is a new creation) or the existing information stored is overwritten by the modified information at the record indicated by the LID# in the location database (if it is an edit).

"Shapes" are stored in the Location database as having "Shape Header" information and "Shape Detail" information. The Shape Header is assigned the LID# and is the same as a location in that it has a single point that marks where a digital map focuses when the shape is viewed. Shapes are defined with additional characteristics including a flag that indicate to the Process that this LID# indicates a shape and not just a location. An LID# flagged as a shape has an additional flag that defines the shape as a "Polygon" or a "Radius". A radius flag will indicate a number is used to measure radius in kilometres while a polygon flag indicates that there exists a series of locations defined in the "Shape Detail" table that are sequentially indexed and can be referenced using the LID#. A radius is displayed on a map as a circle with the centre of the circle located at the defined point in the Shape Header table. A radius may be edited in the "Map and Location" user interface by modifying the distance of the radius.

Figure 1:
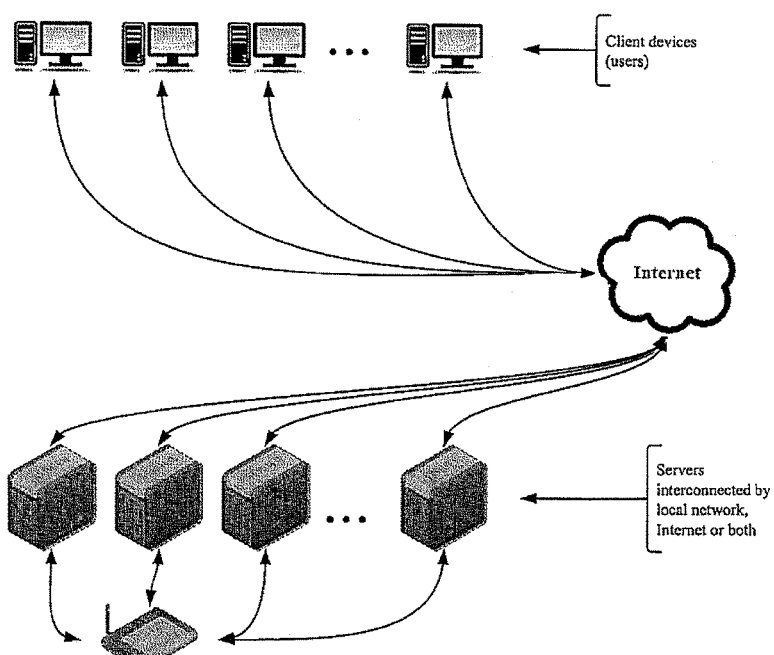
FIG. 1 is a schematic illustration of a system of the present invention for facilitating and processing geospatially sensitive queries from consumers seeking providers of goods and services, and vice versa.
Figure 1A:
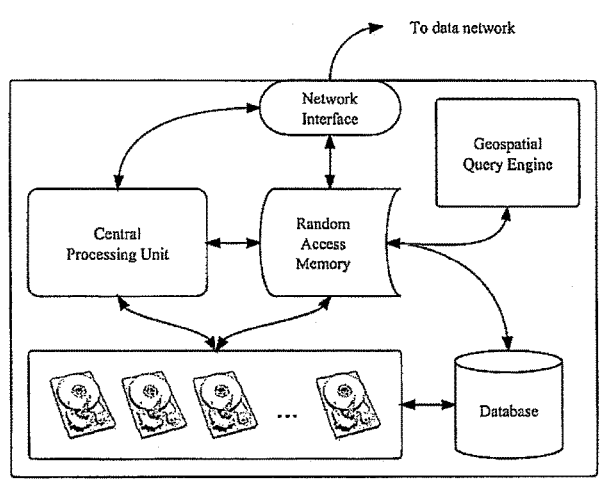
FIG. 1A is a schematic illustration of a server used in the system of FIG. 1.
Figure 2:
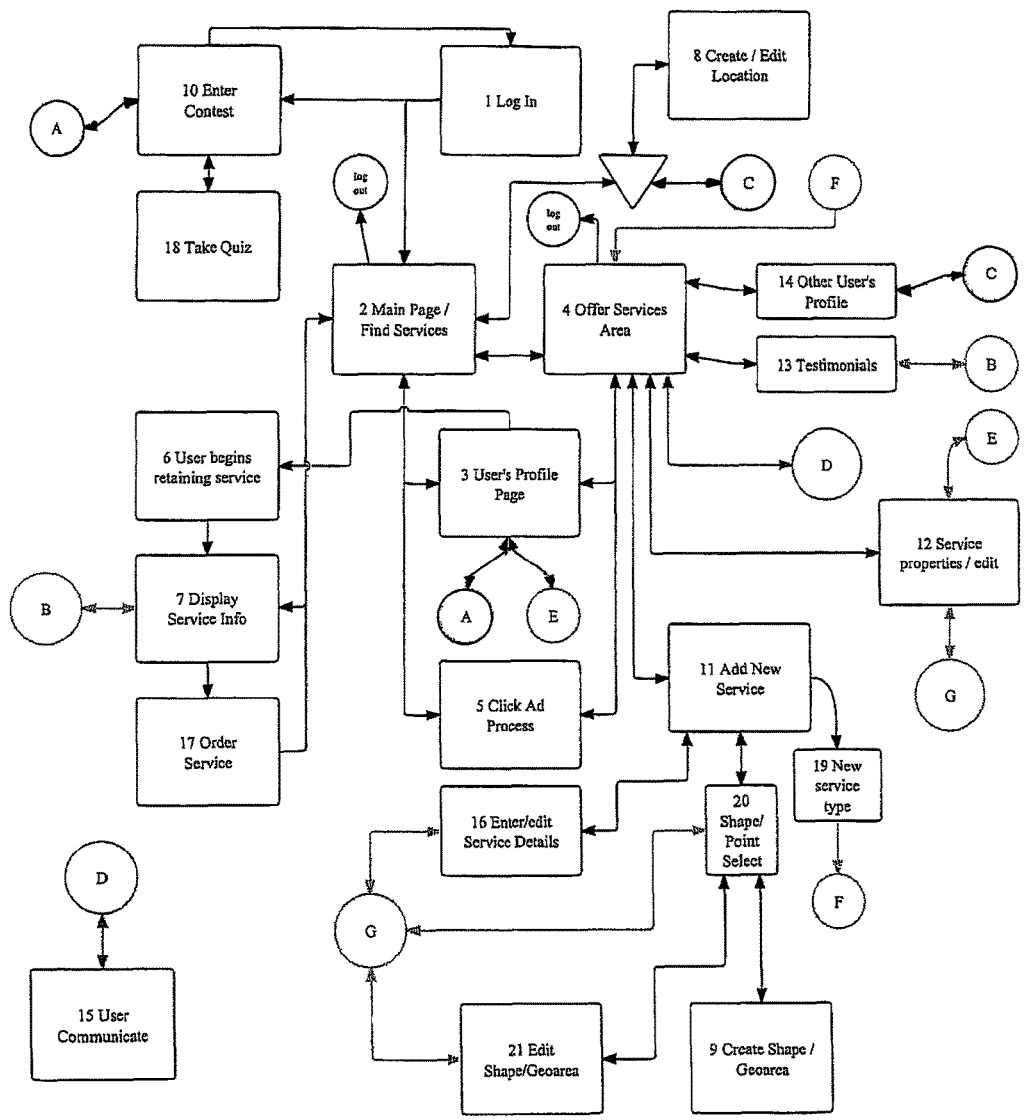
FIG. 2 is a general flow chart overview of a user interface of the system of FIG. 1.
Figure 3:
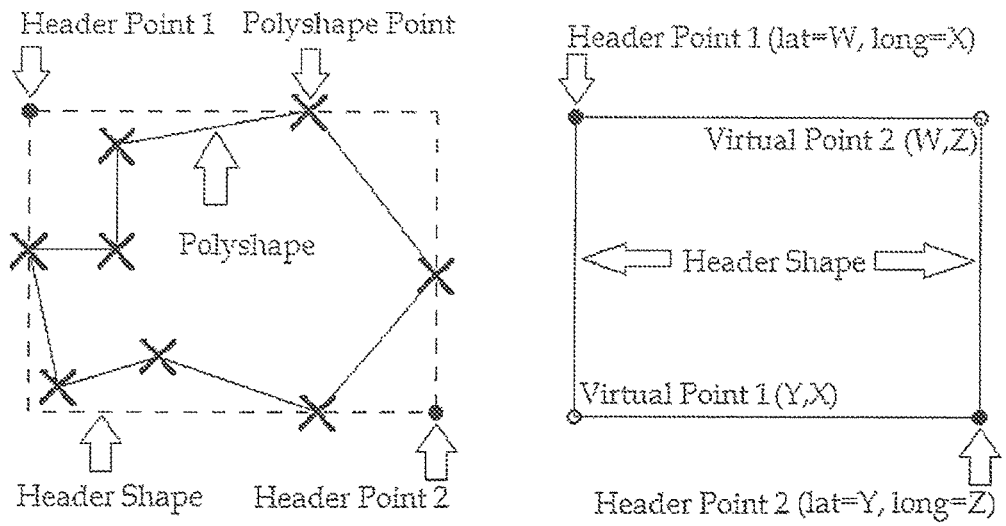
FIG. 3 schematically illustrates a minimum enclosing/containing rectangle technique used in the present invention to screen out geographic locations outside a polygonal geographic area of interest in response to a query for locations inside that area by representing the area as a polygonal shape plotted in a coordinate system, forming a rectangle with sides passing through vertices of the polygon to closely surround the shape and using simple calculations to determine whether coordinate points of the locations in question lie outside the rectangle enclosing the polygon.

The Shape header table also includes two header points that the process calculates for each polygon after it is defined or edited. With reference to FIG. 3, the header points are located at opposite corners of a virtual rectangle and each containing a latitude and longitude of the location. The Process can extrapolate the coordinates of the remaining two corners (called virtual points) as needed to make up all four corners of the virtual rectangle. For example, if the Header points are located at the northwest and southeast corners of the rectangle, the virtual point at the southwest corner is made up from the latitude of the southeast header point and the Longitude of the northwest header point. The northeast virtual point is made up of the latitude of the northwest header point and the longitude of the southeast header point. The co-ordinates of the northwest and southeast corners were likewise obtained from known coordinates of the polygon vertices. That is, the northwest corner of the rectangle has the latitude of the northernmost vertex point of the polygon and the longitude of the westernmost point of the polygon, while the southeast corner of the rectangle has the latitude of the southernmost vertex point of the polygon and the longitude of the easternmost vertex point of the polygon. This virtual rectangle enclosing around or containing the area of bound by the polygon is called the "Header Shape" and is used by the Geospatial Query to speed up processing because it is the smallest rectangular area possible that can encompass all points in the polygon. In other words, it is the minimum enclosing rectangle (MER).

Also in the Shape Header table are two optional points that define a second rectangle known as the "Inner Rectangle" which is produced by performing "best guess largest empty rectangle" calculations on the shape. These points have the same characteristics as the points described in the Header Shape (that is, they are two opposing points of a rectangle that permit extrapolation of the entire rectangle). The points for an inner rectangle are optional because certain polygonal shapes may be too complex to possess an inner rectangle or too simple to need one.

Every aspect of information stored by the Process may or may not have relevance to a current user based on the geographic location of the user (as defined by the LID# assigned in that user's profile) or based on the geographic location tagged to the information of another user. To determine what is relevant, the Process uses the "Geo spatial Query". For information to be geographically relevant, the location of one user's information must fall inside the defined area of another user's information; or the location of one users information must be no further away than the distance defined in the radius of another user's shape. For example, the location of a store is relevant if it lies within the defined shopping area that the user has set to indicate where he or she is willing to travel (be that a polygon shape or a radius) and a service offered is relevant if the area defined as the service area encompasses the location of the current user.

The Geo spatial Query employs math calculations based on information stored in the Location Database. It references information from the LID# of a location and the LID# of a shape. The GQ indicates that the information is relevant if the location is found to be inside the defined area of the shape. If the shape is a radius, the GQ calculates the shortest possible distance between the location and the point indicated in the Shape Header for the radius. If the distance is equal or less than defined distance in the Shape Header, the information is deemed relevant. If the shape is defined as a polygon, then the GQ must first qualify the location as being within range of the polygon by first determining if the location in encompassed by the virtual Header Shape of the polygon.

For the location to qualify, its latitude must be equal or greater than the header point with the smaller latitude and also be equal or less than the other header point's latitude. The location must also have a longitude that is equal or greater than the header point with the smallest longitude and also be equal or less than the other header point's longitude. Disqualifying a location immediately deems the information attached to the shape or location (that is not the information of the current user) is irrelevant to the current user. Qualified locations may still be irrelevant and further calculations are required to determine if the location falls within the polygon.

Figure 4:
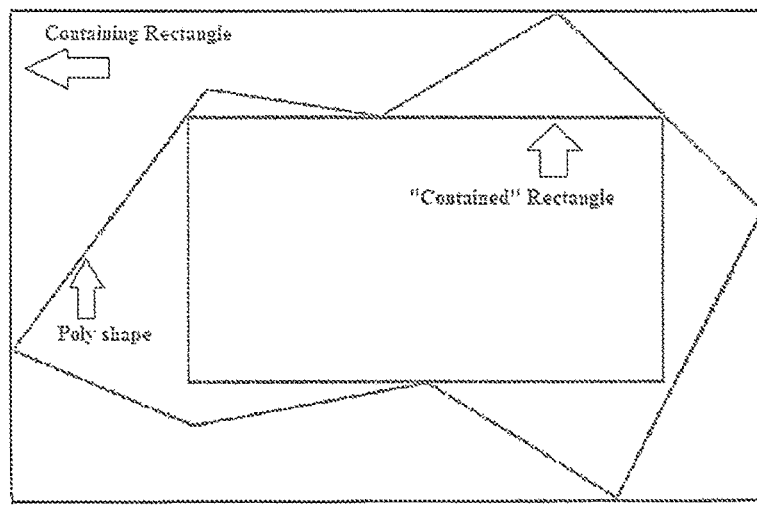
FIG. 4 schematically illustrates an approximated largest empty/contained rectangle technique used in the present invention after the minimum enclosing rectangle technique of FIG. 3 to plot an additional rectangle inside the polygon to again allow use of relatively simple point-in-rectangle calculations to determine whether the coordinate points of the locations lie within this inner rectangle, which confirms that the locations accordingly lie within the geographic area without having to conduct more complex point-in-polygon calculations for that location.

With reference to FIG. 4, similar to a MER containing the polygon, a "largest Empty Rectangle" (or LER) contained in the polygon can be defined at the time the polygon is created. A LER is classified as a rectangle that is empty (in other words, it does not contain any vertices of a polygon nor does any part of a line that connects two adjoining vertices pass through it) and could only be contained by another rectangle that was not empty. The benefit of knowing the LER of a polygon is that if a point is found to be inside the LER, it is by definition inside the polygon. LER calculations are well known and documented in mathematical and computer science fields. Unfortunately, a true LER is extremely complex. It requires more computational resources in advance to define, more database resources to store the results and must use a more complex type of point-in-rectangle calculations during a geospatial query. The calculation overhead negates the benefits of using the LER over simply performing known point-in-polygon calculations directly.

We disclose the method for producing a Best Guess Large Empty Rectangle (or BGLER) within a polygon. A BGLER is empty and not rotated out of an orientation aligning its sides parallel to the axes of the coordinate system, so that it may be rapidly queried using the same point-in-rectangle method used for MER's. A BGLER can also be calculated much faster than LER. While the BGLER may not be the largest possible empty rectangle within the polygon, it presents a good compromise between reduced workload on the system (permitting more resources to be used by the numerous GSQ's that may need to be process by the system) while reducing the amount of real time calculations required by the GSQ.

However, it should be noted that the present invention does not necessarily exclude a classic use of LER calculations, but rather we use the BGLER in a preferred embodiment. For example, it is contemplated that perhaps as technological advances increase CPU speeds, the overhead required for LERs can be met at reasonable cost and effective performance levels.

Figure 7:
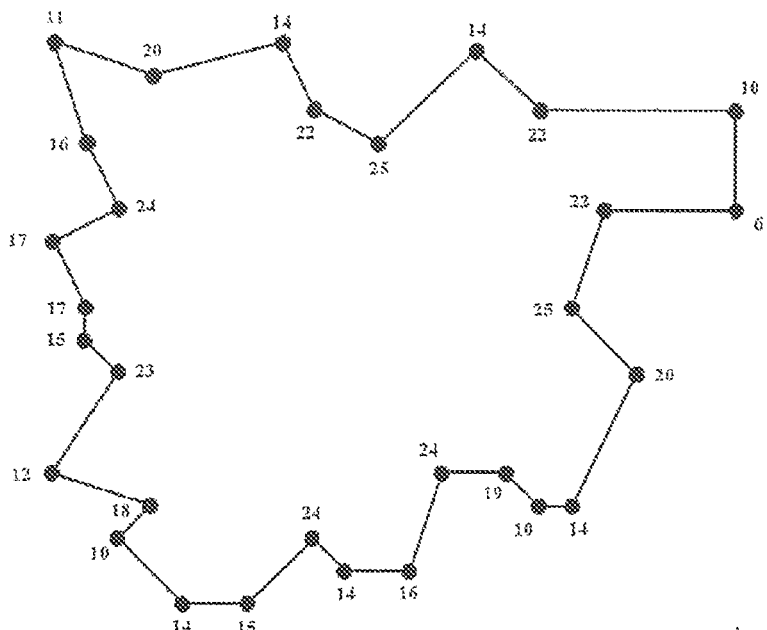
FIG. 7 shows the count results for all of the vertices of the polygon of FIG. 5.

With reference to FIG. 5, start with a polygon of n points (in this example, there are 30). Now referring to the FIG. 6 illustration of the vertices or points of the polygon without the interconnecting lines therebetween, starting with one point, calculate the path taken by a straight line from that point to each additional point on the polygon, then count the number of these lines or rays that do not at any point exit the polygon (in the case of the point for which this is illustrated in FIG. 6, 11 rays, the ones drawn in the Figure, would remain inside the polygon). Repeating this process for all 30 points will result in a ray count for each point of the polygon, as illustrated in FIG. 7.

We now want to calculate a reduction factor (r) using the formula $r=m^2/t$, where m is the highest ray count out of all the points in the polygon and t is the total points in the polygon. In the illustrated example, the point with the highest count of all points of the original polygon has a count of 25, with the total number of vertices equaling 30. In actuality we are first calculating a percentage in the form of the highest ray count over the total number of points in this polygon (in this case 25/30=83.333%), and then multiplying this percentage by the highest ray count to obtain a reduction factor (83.333%*25=20.8333).

Figure 8:
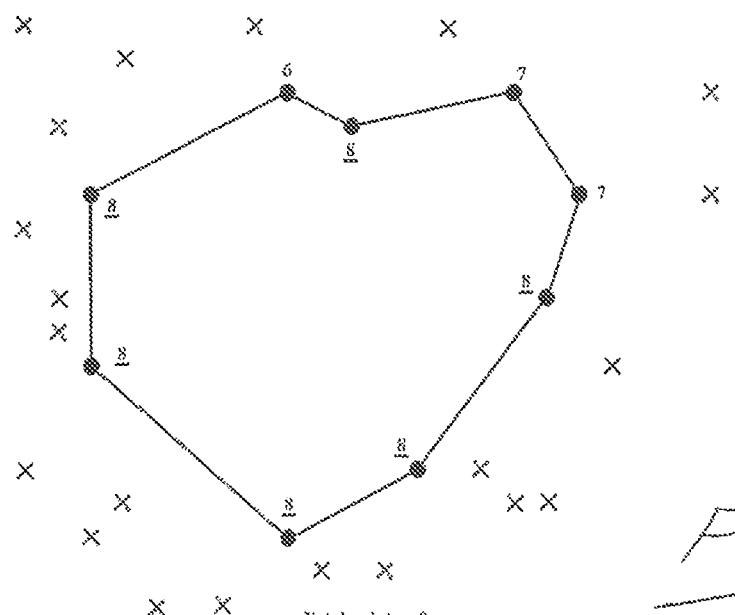
FIG. 8 shows a reduced nine point polygon derived from the thirty point polygon of FIG. 5 by removal of the vertices having counts less than a reduction factor calculated from the straight line or ray counts of the original polygon.

This reduction factor tells us how "complex" the polygon is and indicates which vertices are most likely irrelevant in determining a BGLER by acting as a threshold. Any vertex with a ray count below the reduction threshold is omitted from the next calculation. In this example, all vertices from FIG. 7 with a count of 20 or below appear as X in FIG. 8. From these selected vertices, a simpler or reduced polygon is calculated as that defined by sequential connection of the remaining vertices in the order dictated by the sequential indexing of the points or vertices of the original polygon.

Figure 9:
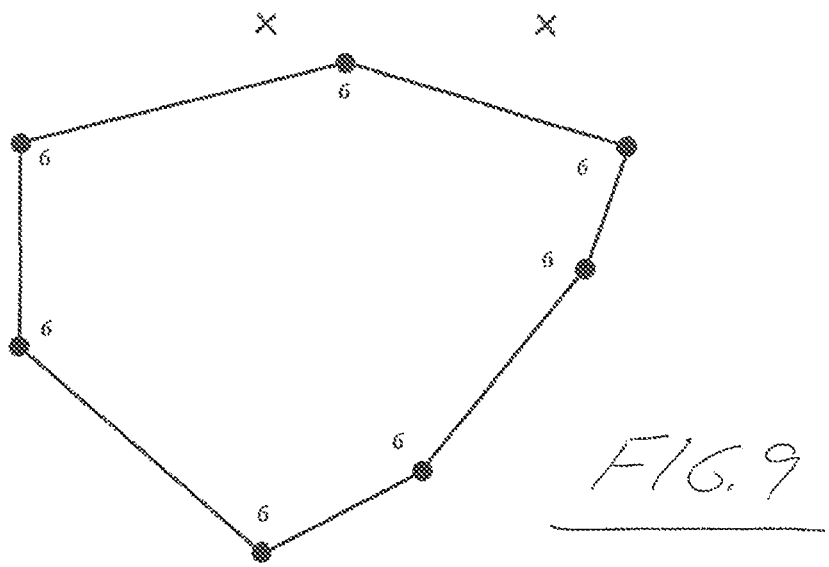
FIG. 9 shows a further reduced seven point polygon derived from the nine point polygon of FIG. 8 by removal of the vertices having counts less than a further reduction factor calculated from the ray counts thereof, the ray counts of the resulting seven point polygon all being equal and thus dictating that no further reduction is required.

The reduction factor determination process then repeats for the simplified or reduced polygon. In the illustrated example, we now have a 9 point polygon illustrated in FIG. 8 and the highest ray count is 8, leading to a reduction factor of $r=8^2/9=7.1111$, meaning only the points with ray counts of 8 and above are kept for the next calculation. This continues until all the points in the simpler polygons are equal in their ray counts, or i.e. until all points in the poly can see every other point along a straight sight line. In this example, we have reached this completion point of the reduction or simplification process upon having moved from the 9-point polygon of FIG. 8 to the 7-point polygon of FIG. 9. These remaining points are "prime points" that we will use on the original polygon to calculate the BGLER.

Figure 10:
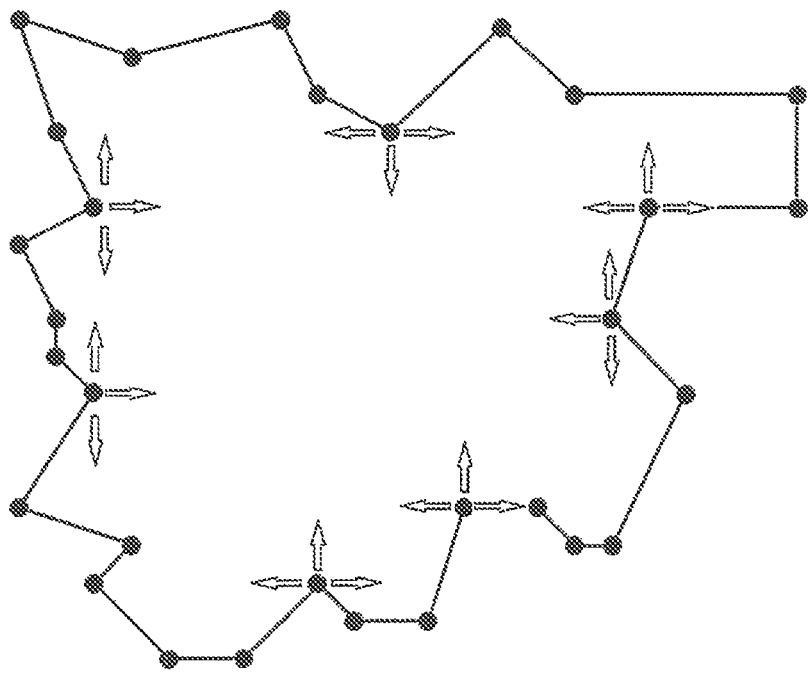
FIG. 10 shows use of the vertices of the seven point polygon of FIG. 9 as prime vertices of the original thirty point polygon to be used in forming sides of inner rectangles that fit within the thirty point polygon as candidates for the approximated largest empty rectangle.

Next, turning to FIG. 10, we evaluate how each prime point is positioned in the main polygon by projecting four rays from each prime point—two in opposite directions along the x axis and two in opposite directions along the y axis, so long as the ray is not projected outside of the polygon at its department from the respective point. These "valid rays" cooperate with each other to create possible rectangle shapes that can be evaluated as the BGLER.

A prime vertex will generally have two or three valid rays (exceptions are noted after this example). By knowing how many valid rays emanate from a prime vertex, we can determine which out of a series of scenarios we should subject the prime vertices to. For example, a prime vertex with three valid rays (known as a 3 ray prime vertex, or 3-RPV) can be used to define one side of a rectangle and a 2 ray prime vertex (2-RPV) can be used to define where two sides of a rectangle meet. These scenarios solve any unknown points that are required to define the rectangle and ensure that it is completely enclosed within the polygon or modify it so that it will be completely enclosed by the polygon. In the event that multiple inner rectangles can be solved for, the rectangle with the largest area is the polygon's BGLER.

Figure 11:
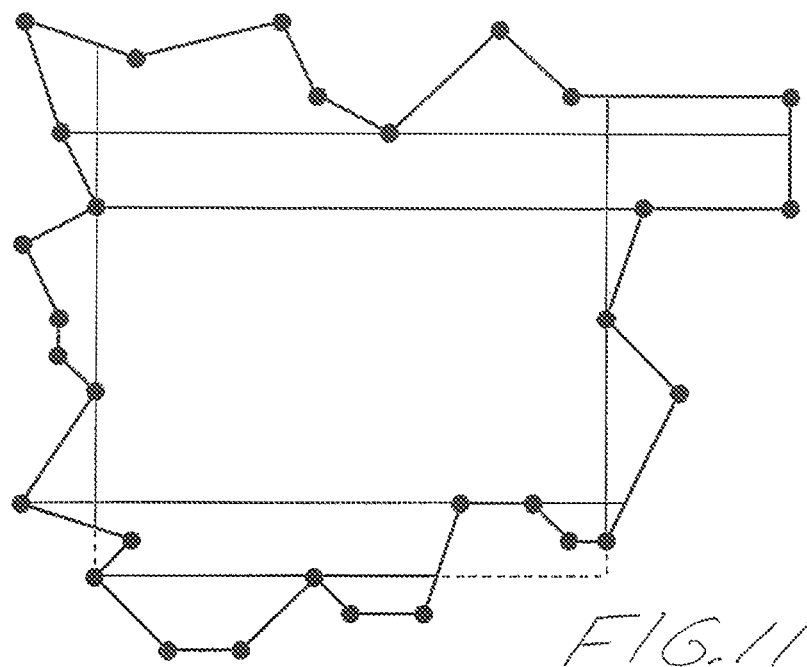
FIG. 11 shows how lines can be extrapolated from the prime vertices in FIG. 10 in order to produce the sides of a rectangle.

In the case of our illustrated example in FIG. 10, we have two prime vertices that can form the left side of the rectangle (each having upward and downward pointing vertical rays and a single horizontal ray pointing to the right), three prime vertices that could form the bottom of the rectangle (each having left and right pointing horizontal rays and a single upwardly pointing vertical ray), one prime vertex that could form the top of the rectangle (having left and right pointing horizontal rays and a single downward pointing vertical ray) and one prime vertex that could form the right side of the rectangle (having upward and downward pointing horizontal rays and a single left pointing horizontal ray). As illustrated in FIG. 11, numerous rectangular shapes can be derived from these prime vertices, however not all of them would be entirely contained inside the polygon.

In the case of 3-RPV's, if we find only one prime vertex that can define one side of the BGLER, we can assume it is correct. In this example, there is only one candidate for each of the top and right sides of the rectangle. In the case of the left side of the rectangle, the two candidate vertices are parallel along the y axis (meaning that a straight line passing through the two points is parallel to the y axis and so the points are aligned along the x axis and thus share the same x-axis coordinate), and so they define a single vertical line qualifying as a potential candidate for the left side of the BGLER extending parallel to the y axis, which can therefore also be assumed to be correct. Out of the three qualifying points that have the potential to make up the bottom of an inside rectangle, one of the three (the lowermost of the three in FIG. 10) cannot complete a rectangle shape without having its right-pointing ray extend outside the polygon to intersect with the downward pointing ray of the only candidate for the rectangle's right side (this is determined by using the prior art technique of determining if a line extended from a point will intersect with the border of the polygon and if the count of intersections is greater than zero, then we know the prime vertex in question cannot be used to define a BGLER). This leaves two possible bottom lines to the rectangle, as defined by the horizontal rays of the two remaining bottom-line candidate points.

Figure 12:
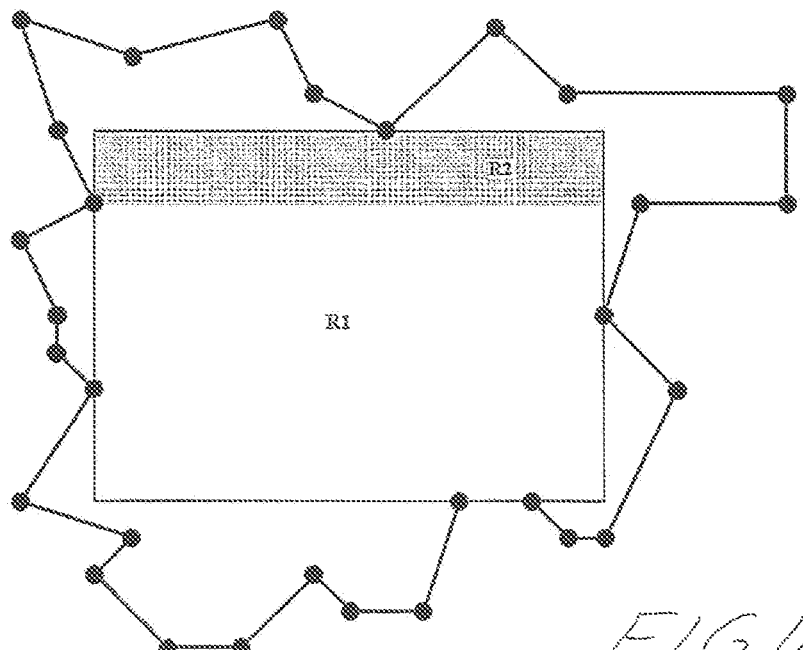
FIG. 12 shows the only two rectangles that could be contained inside the polygon based on the lines of FIG. 11.

We can calculate a possible rectangle by assigning P1 (located at x1, y1), P2 (located at x2, y2) . . . P4 (located at x4, y4). We assign the P's by using the four qualifying prime vertices, determining the minimum and maximum values along each the x and y axes from among the co-ordinate values of the four qualifying prime vertices (i.e., if P2 is the upper right corner of the rectangle, x2=the largest x coordinate value of the four prime vertices and y2=the smallest y coordinate value from the four prime vertices). Once we have the rectangle defined, we can calculate the volume or area of the rectangle as its length times its width. In the illustrated example, we form two rectangles and calculate the area of both. FIG. 12 shows one of the rectangles shown as solid lines (R1) and the other as a shaded area (R2). The rectangle with the greatest area of the contenders is the BGLER for the particular polygonal shape being processed. For the illustrated example, R1 in FIG. 12 is thus identified as the BGLER.

A polygon may have a prime vertex that will not result in a 3-RPV or a 2-RPV. A four ray prime vertex (4-RPV) is still used in the evaluating of a rectangle, however it will increase the number of rectangle calculations since it cannot be accurately predicted if it will define a rectangle's line (like a 3-RPV) or the intersection of two lines (like a 2-RPV). Thus, it is treated as a wildcard by each of the scenarios. For example, if a particular scenario would use the 4-RPV if it instead were a 2-RPV with valid rays pointing in the desired directions, then that scenario treats the 4-RPV as if it were in fact the 2-RPV with the characteristics desired.

A one ray prime vertex is always ignored.

We have described a situation where a single scenario (four 3-RPVs that produce all four sides of a rectangle) exists more than once for a given polygon. In fact, polygons generally produces prime vertices that may not all be used by any one scenario to solve for a rectangle. FIG. 13 illustrates a polygon with three prime vertices P1, P2 and P3 that together cannot produce a single rectangle shape. Thus, each prime vertex is evaluated against all other prime vertices to determine the scenarios that exist for any given combination of prime vertices. In the case of FIG. 13, points P1 and P2 can be evaluated as the scenario "2 two way prime ray vertices that have the same value on one axis" (described later). Points P2 and P3 produce the scenario where 2 two way prime ray vertices that form opposite ends of a rectangle (described below). Having identified how all prime vertices can used to produce scenarios that define rectangles, we produce all possible rectangles, calculate their area and then use the rectangle with the largest area as the polygon's BGLER.

Another scenario we look for is when two 2-RPV will form opposing corners of a rectangle. Illustrated in FIG. 13 are points P2 and P3 which can form a rectangle by extending perpendicular rays from the two points to where they intersect and using these "virtual points" together with points P2 and P3 as the four corners of the rectangle. However, it is possible that the virtual points that are created will exist outside of the polygon. This is determined by making a Point-in-Polygon calculation against each virtual point created. If a virtual point is found to be outside of the polygon, we use the method described in the next paragraph to shrink the rectangle until it is enclosed within the polygon. Finally, any rectangle defined using this scenario must have Point-in-Rectangle calculations performed against it using any 3-RPV that were not used to produce the rectangle in the first place. If the result is true, then the rectangle is disqualified as a candidate for the BGLER.

In the scenario where two 2-RPVs form opposite corners of a rectangle, the two produced virtual points (for example v1 and v2) may exist outside the polygon. In this case, a line is projected between v1 and v2. If for example v1 is outside of the polygon, a new virtual point (v3) is created where the projected line starting from v1 intersects with the boundary of the polygon. If v2 is also outside of the polygon, then and second new virtual point (v4) is created where the projected line starting from v2 intersects with the polygon. Now the relevant virtual points are evaluated as known points inside the polygon that form opposite corners of a rectangle (for example, v2 and v3 if only v1 is outside of the polygon or v3 and v4 if both v1 and v2 are outside of the polygon). We can then use the same calculations used with MERs to solve for the remaining two corners of the rectangle knowing that these points will fall within the polygon (notwithstanding the final Point-in-Rectangle checks against 3-RPVs as described previously).

Other scenarios can take the form of (and can be solved by):

Two 3-RPV's that produce parallel lines of the rectangle (see FIG. 14)
  Each of these will either have its two parallel but opposite rays extend along the x or y axis (x-axis in FIG. 14), so we will already know the minimum and maximum values of the rectangle for the other axis (y-axis in FIG. 14), as defined by the spaced-apart positions of these prime vertices therealong—we must solve for the minimum and maximum co-ordinate values the axis along which the four parallel rays of the two vertices extend
  Define the intersection points where each of the four parallel rays contact the polygon
  Two of the intersection points will have values (Lb1, Lb2 in FIG. 14) along this axis (x-axis in FIG. 14) greater than the value of the point from which the rays began—use the lesser of these two values (Lb2 in FIG. 14) as the maximum value along this axis
  The other two intersection points will have values along the same axis less than the value of the points from which the rays began—use the greater of these two values as the minimum value along this axis (These intersection points have an equal value La1 in FIG. 14)
  Unless there is a scenario where the minimum calculated value is greater than the maximum (in which case we disqualify this scenario as one able to evaluate a BGLER) we now have the values to calculate the rectangle
  We may have to create multiple rectangles and calculate for the greatest area if there is more than a single qualifying 3-PRV along one or both of the parallels.

Two 3-RPV's that produce perpendicular lines in the rectangle (see FIG. 15)
  One of the two parallel rays from the first point (P1 in FIG. 15) will cross one of the two parallel rays from the second point (P2 in FIG. 15)—the intersection (point I1 in FIG. 15) of which makes up one corner of the rectangle
  The other of the two parallel rays of each prime vertex that extends in the opposite direction will eventually intersect with the polygon—these intersections shall be called v1 and v2
  Extend rays (La1, La2 in FIG. 15) from v1 and v2 so that one is along the x axis and one is along the y axis and that both rays intersect—this point shall be called "point I2"
  If "point I2" is inside the polygon, then it forms the opposite corner of the rectangle, which is now defined since two opposing corners have been identified
  If "point I2" is outside the polygon (as in FIG. 15), then we extend a ray (Lb in FIG. 15) between the first identified corner "point I1" of the rectangle and the "point I2", which is now disqualified from being a potential candidate for the opposite corner point since it is outside the polygon. Where this ray intersects with the polygon (I3 in FIG. 15) is the point that defines the opposite corner of the rectangle Two 2-RPVs that have the same value on one axis (see FIG. 13: P1, P2)
  The shared coordinate on the one axis (y-axis in FIG. 13) gives us one side of the rectangle as a line (La4 in FIG. 13) that is perpendicular to that axis and interconnects the two prime vertices (P1, P2 in FIG. 13), the other co-ordinates of which us the minimum and maximum value of the rectangle on the other axis (lines La1, La2 in FIG. 13)
  Extend the two rays of the two prime vertices that point in the same direction along the axis (y-axis in FIG. 13) along which the vertices align along this axis until they intersect with the polygon
  If these intersecting points have values along the axis they're parallel to that are greater than that of the two originating points (i.e. if the rays extend from the vertices in the positive direction), then select the lesser of the co-ordinate values of the two intersection points along this axis—otherwise (as in FIG. 13), they will have values that are less than the originating points on the appropriate axis (i.e. the rays extend in the negative direction), in which case selected the greater of the two co-ordinate values on this axis—in either case, we have solved for the fourth side (La3 in FIG. 13) of the rectangle. That is, the extended rays define the two sides that extend perpendicularly from the first side defined by a line interconnecting the two vertices, and the fourth side perpendicularly interconnects those two sides at the selected co-ordinate value along the axis of the two extended rays.

Three 3-RPVs producing two parallel and one perpendicular line of the rectangle (FIG. 16)
  We can use the same solution as above by taking the points of where the two parallel lines of the rectangle (La1, La3 in FIG. 16), as dictated by the parallel rays of the two prime vertices (P1, P3 in FIG. 16) having four such parallel rays, intersect with the perpendicular line (La2 in FIG. 16), as dictated by the two parallel rays of the other prime vertex (P2 in FIG. 16), to defined two corners (I1, I2 in FIG. 16) at one end of the rectangle, then solve for the 4th side by extension of the two same-direction rays of the two prime vertices (P1, P3 in FIG. 16) having four parallel rays among them to intersections with the polygon boundary and selection of the intersection point having a value (Lb in FIG. 16) closer to the other prime vertex (P2 in FIG. 16) along the axis (x-axis in FIG. 16) along which the rays were extended.

Multiple 2-RPV that can only be evaluated singularly (FIG. 17a and FIG. 17b)
  We identify any 2-RPV that cannot be matched up with another 2-RPV in a previously described scenario
    evaluating each identified vertex individually so that each vertex is one point in a unique rectangle; by
      determining a first intersection point (I1 for P1, I4 for P2) where the first ray intersects with the boundaries of the polygonal geographic area;
      determining a second intersection point (I2 for P1, I5 for P2) where the second ray intersects with the boundary of the polygonal geographic area;

determining a third intersection point (I3 for P1, I6 for P2) where perpendicular lines (L1c, L1d for P1, L2c, L2d for P2) extending from the first and second intersection points intersect;

determining whether the third intersection point lies within the polygonal geographic area, and if so (as for P1), using the third intersection point as a second corner of a rectangle (L1a, L1b, L1c, L1d) opposite the identified vertex (P1), but if not (as for P2), then determining a point of intersection (I7) between the boundaries of the polygonal geographic area and a straight line (L3) interconnecting the third intersection point (I6) and the identified vertex (P2) and using said point of intersection (I7) as the second corner of the rectangle (L2a, L2b, L2e L2f) opposite the identified vertex;

determining the area of each rectangle generated by evaluating each identified vertex by multiplying its length by its width;

determining the rectangle that has the largest area and assigning the identified vertex as one corner of the inner rectangle of the polygonal geographic area, and assigning the corner point opposite the identified vertex as the second corner of the inner rectangle.

Other combinations of 2, 3 and/or 4 ray prime vertices can exist, however in such cases the polygon will not have enough open area along the x and y axis to make a BGMER worthwhile or the polygon is simplistic so the real time point-in-polygon portion of the geospatial query will not have to make many calculations to get the correct result. In an optional feature that can be enabled and set by the administrators of the Process, the calculated area of the BGLER can be measured as a percentage of the area occupied by the polygon itself. If the value is below the set threshold, the BGLER is discarded.

Assigning a BGLER requires many calculations, however not as complex as calculating a true LER. Having a BGLER permits the geospatial query to perform a second point-in-rectangle calculation against the associated polygon should it be found that the first calculation has the point inside the MER. Only if the point-in-rectangle is false for the BGLER does the query need to move to the more complex point-in-polygon calculations. Considering that a single polygon may need to be queried millions of times once created, the short term overhead in creating the BGLER is worthwhile. When situations arise where mass volumes of polygons must be searched due to the simultaneous queries of a large number of users, reducing real time calculations through the use of a successful second point-in-rectangle check will greatly extend the point where processing bottlenecks could degrade the user experience with the invention.

During a geospatial query, if a location being compared to a polygonal area is found to be within the MER, but found not to be within the BGLER, only then does the process employ a point-in-polygon technique to make the final determination of whether the location is situated within the area. The process can employ a known prior art technique for this final stage of the determination process, for example using the technique of counting intersections of a straight line emitted from a point marking the location with boundary lines of the plotted polygonal area and using an odd result to indicate presence of the point inside the polygon and an even result to indicate the point as located outside the polygon. Such techniques are described in prior art references listed herein in the background of the invention, all of which are incorporated herein by reference.

The "Marketplace" is a special area in the user interface where any user, regardless if they have provided a user name and password, can use the "Map and Location" interface to define an area and have the GQ filter out advertisements that do not fall within the defined area. Users that have provided a user name and password can further refine their searches by indicating what products or services that they are in the market for and having these results stored in the Product and Service Characteristic Database with a unique PSCID# tied to their MID#. This allows the Process to only consider advertisements with similar characteristic in addition to being geographically relevant to be displayed in the special advertising panels in the Marketplace. Users may also set a default shape or radius in their profile for use in the marketplace which in conjunction with their Product and Service characteristics will allows the Process to discover new advertisements as they are added to the Advertisers Database and even alert the user (based on the users settings) by issuing an email.

The service list that is displayed for a user in the "Service Locating" section of the user interface displays all services that have been deemed relevant to the user by the GQ. All Services Available have been created as a Service Types and each service type is assigned one or more Service Categories. When a user looks at a list, it begins as a list of Service Categories that contain active Service types. Moving the mouse pointer over a Category and clicking the mouse button expands the list to include all the active service types within it (expanded lists are nested so that each sub list is clearly indicated as belonging to the Category). A service type is active when there are services available within that category. A service type can be expanded in the same manner as the service category to display a nested list of all users that offer the service type. Moving the mouse pointer and clicking the mouse button on a service provider listed opens up a new subsection of the user interface called the "Service Listing". Users may set a preference in their profile section to include all services that do not have active service providers. These empty service types have a different appearance and clicking on them results in a record being saved in the "Services Requested" database, and each such record is assigned a unique Service Request Identification Number (SRID#). In addition, each record holds the user's MID#, the desired STID# and the user's default LID#. The service list may be sorted in various ways by a user, however the default order is by the rank associated to the respective SAID#.

The "Service Listing" interface displays the text and media that the other user included when populating the "Services Available" database. It permits the current user to read and view all information that the Process makes available to the current user. Depending on the preferences of the other user, some information may be withheld from the current user until a set of circumstances are met by the current user, the service providing user or both. When circumstances that satisfy the release of information are met, this information is made available in the appropriate user interface locations and electronic notifications that extend outside of the Process can be sent to the appropriate users based on their preferences. A service listing may include a "Request Service" button that can be activated by the current user by mouse click. When a user activates this button, a record is created in the "Contract Database" which references the MID# of the current user, the MID# of the service providing user and the SAID# of the requested service along with the date and time of the request. This record is assigned a unique Contract Identification number (CID#) and further information in regards to the circumstances of both users are recorded so that the Process can determine what information is available to be released to each user.

When a user's MID# becomes associated with a CID# in the contract database, it allows that user to access the "Ranking Area" of the user interface. If the user is the service provider, he or she may populate a "Ranking" database with the date and time the user performed a service for the other user; or the service providing user may populate the ranking database with text describing the nature of the user that requested the service and assign that user a rank. Available ranks are static and can be selected from a list generated by the Process by accessing the "Administrator" database.

Users that request services may use the Ranking area to see a list of all services provided to that user based on what is populated in the Ranking database; or the user may populate the Ranking database with the date and time that a service providing user performed a service for the user. In either case, the user can include text describing the satisfaction with the service provided and assign a rank that will become associated with the SAID#. Every record stored in the Ranking database is assigned a unique Ranking Identification Number (RID#) and holds the MID#'s of both users involved as well as the SAID# of the service being ranked. Rank is calculated based on the number of instances a SAID# is indicated as being completed and the actual ranks assigned to each of them. In the event that a requesting user does not issue a rank to a service performed log in the Ranking database, the last issued rank for the same SAID# provided by the service providing user shall be used. If the service requesting user never ranks a given SAID#, then all SAID# references from that service requesting user will not be used in the overall rank calculation of the service referenced by the SAID# for the service providing user.

There may be conditions or circumstances that need to be met in order for contact information or other service-related information of a service provider to be released to the consumer who has found that service provider through a geospatial query. In one embodiment, there are two circumstances. First, one of the users must pay "credits" and second, the service provider must agree to the releasing of his information. Generally speaking, if accounts don't have credits, one of the users must purchase them "on demand". If a provider has a credit balance, or the consumer is willing to pay the credits, the service provider can set their profile to automatically release contact info or to hold it until they manually confirm the release. There is also a prevision to suspend the auto release if a certain amount of releases occur within a user defined time frame.

The contract is used as a term to indicate that a user has begun a transaction with another user, be it a consumer requesting a service, a consumer clicking in to a service listing where contact info is displayed or a user clicking on an ad. The action is recorded as a contract which is used to track the progress of the transaction and if or when payments have been made. It also acts as a double check so that users are not charged for things they have already paid for (e.g. a client who clicks on to a "pay per viewing" profile over and over will only result in a charge to the profile owner the first time).

Some examples of specific "pay" scenarios are as follows: Users conduct transactions within the site using credits. Credits are obtained through the site and paid for through an online process, e.g. through PayPal. A user may buy a small sum of credits at one time for one price or a larger sum of credits at a discount off the per credit rate (e.g., 20 credits=$9.99 and 200 credits=$55). If a user enters into a transaction where they need credits to complete it, they either have to have enough credits in their account or they are taken to the 'Buy Credits' area to top up their account. With sufficient credits in their account, the transaction can be concluded and the appropriate credits will be debited and the database that tracks the contract will be updated to reflect the payment was made.

Transactions that result in a debiting of credits include: one user paying for contact information to be exchanged with another user; a service provider wishing to display contact information in their service listing (there is no charge to list it, but there is a charge as unique users visit the listing); an advertiser using banner ads on the site must pay each time a unique user clicks the ad; a service provider can pay for a lead (this is where consumers requests the provider contact them even though they are looking at a service listing with contact information); advertisers can pay a flat rate to advertise only to a specially selected group of users by using queries and filters within the site to select the ideal group. In addition, there are other ways that the system can conduct transactions, such as charging for the use of more advanced searching tools, unlocking features in the site that enhance the user experience or adjusting the way information is displayed in the system, to name just a few.

Although the detailed example laid out above refers primarily to service providers and consumers seeking services, it will be appreciated that the system can also be employed in a similar manner to advertise/list and seek goods or products. Where the goods are delivered by the merchant/vendor/provider, then the consumer may similarly use their location to query for vendors having a delivery area that encompasses the desired delivery location, which may be the consumer's residence or another location. In other cases, the consumer instead may be seeking products or services that must be performed at the service provider's location and thus define a geographical shopping area to or within which they are willing to travel to obtained the desired product, product type or service.

It will be appreciated that even in embodiments employing the LER or BGLER to screen out irrelevant locations before completing complex point-in-polygon calculations, other techniques may additionally be employed in early stages of screening before the final point-in-polygon technique that only need be used when locations or areas remain that have not been eliminated in the preliminary stages of the determination process. For example, the aforementioned "Quad Key" technique may be used to speed up the disqualifying of shapes. In aforementioned U.S. Pat. No. 7,287, 002, it referrers to "quadrilateral regions" and how they are, like Zips, a predefined area that become exponentially more CPU intensive the finer the region becomes. No matter how defined the quads become, they are still square areas that stack like blocks to make the shape, so a true poly shape cannot be defined However, there are situations where Quad keys can be used as an alternative or in addition to R-Trees as a means of grouping vast numbers of unique but geographically similar polygons.

With reference to FIG. 22, this may be used as a way to take very extensive collections of shapes and use Quad Keys to narrow the field prior to performing the "enclosing rectangle" search. In short, a quad key works like this:

- The Lat/long coordinate system of the Earth are sampled at static intervals and then mapped to a grid of whole numbers (Grid #1)

Grid #2 is an identical to Grid #1 with the exceptions that Grid #2 has an additional row and column and Grid #2 is offset so that the center of each square in Grid #2 is a point defined by the intersecting lines of grid #1

A true lat/long coordinate can only reside within a single square of Grid #2 and when evaluating a point, the square that encompasses the point is deemed "The Enclosing square"

An enclosing square is defined by an X and Y value which are the whole numbers assigned to Grid #1 that intersect in the center of the enclosing square Thus, a location (or point) is assigned an X and Y value X and Y are whole numbers that can be converted to 16 bit binary numbers the binary of each are interwoven to make a 32 digit binary number, "I"

The 32-bit number is converted into a base 4, 16 digit number, "Q"

Points are represented as a base 4, 16 digit numbers. Shapes have many points, each of which may reside in different enclosing squares. This means every point in the shape can have the exact same number or a different number than every other point in the shape. If all points of a shape have the same number, then the shape is also defined by the same number. If not, each point's number is evaluated as a string of 16 individual digits starting from the first digit and extending to the last digit. The shape is assigned a base 4 number that is the largest number of digits that can be made up as a sub-string that is identical for every point within the shape, starting with the first digit.

For example, a large triangle may be defined by the following three points: 1012212202030200, 1012212202101032 & 1012212202311103. The largest string of numbers that is identical to all three points is 1012212202. Since polygons can be made up of dozens of points, it is more efficient to derive the shape's quad key based on the four points of its Header Shape (or MER).

Shapes and points defined by quad keys can be compared using more rapid arithmetic queries using whole numbers which is faster than geospatial calculations. While the quad key method is not exact, it can narrow down the list of qualifying points to be evaluated against a shape or shapes to be evaluated against a point. Specifically, if the quad key of a shape matches a substring of numerals of a location, then that location is very likely to be encompassed by the shape.

The method of the present invention can store a quad key in the database, assign the key to the appropriate LID# and rapidly speed up real time determination of whether points are contained within polygons by:

Using whole number mathematic queries to ensure only qualifying polygons and/or points are passed to the Geospatial Query Engine then disqualifying polygons and/or points where the point is not contained in the polygon's MER then returning the "point is in polygon" result if an evaluated point is contained within the polygon's BGLER then finally using the definitive intersection count point-in-polygon determination when points are found within a MER but outside of a BGLER This quad key method is also advantageous in situations where volumes of geographical data become so immense that separate servers must be assigned for defined regions. Entire database subsets tied to LID#s that fit a defined subset can be moved to a new server. This lessens the computational requirements of each server and thus increases performance, all without having to perform geospatial queries on the entire database to determine the appropriate data set to move. This also provides the means to have multiple servers that can service different types of geographical areas. For example, polygons that are defined across a tri-state area could reside on one server while polygons that define more local areas within one state could reside on a separate server. These servers would act as a single process due to interconnection over the distributed network.

The system and process disclosed herein are different from the aforementioned prior art in a number of ways.

U.S. Pat. No. 7,287,002 of Asher et al. defines a process where by the user "orders" something from a vendor and the process then automates much of the order fulfilling process. The user goes on the site and orders something from a company that is represented on the web site. With the system disclosed herein, the user is in essence "ordering" contact information, but is ordering that from the system/process owner/operator, not from another company through the owner/operator. The reference provides great detail about the whole point in poly process, but appears to never state where or how the poly was created in the first place. Unless the prior art system uses some industry standard format that can be uploaded, representing a shape as data can take many forms, all of which are correct and most of which will not make sense to processes expecting a different format. It is also facilitating a generally static "shape database" where as the shapes are defined as semi permanent areas (e.g. restaurants with delivery or defined franchise regions) that generally do not change after being defined. Also, this only deals with vendors having the shape and the customer being the point. The volume of data would seem to be dramatic, due to the need to boil things down to a street address and how each vendor (shape) also has a "map file" of street names and addresses that fall within the poly shape. This is a side effect of the "order taking" process—when a user orders a pizza, the pizza delivery party must have a valid address to drive to because there is no communication between the customer and the vendor.

The present process includes the interface to create (and later modify) the shapes to accommodate for the ever changing needs of the user. The user that deals with the shapes hands-on as a part of the process, not having to have a "representative" of the web site facilitate its creation or use a 3rd party software. Accordingly the present invention can accommodate a vast number of undulating users comprised of multiple points and shapes that need to be active, inactive or modified on demand. The customer is not required to just be the "point" in the geospatial equation. Customers may represent the shape in the equation; or the customer may represent a shape in one equation and a point in another equation where both equation results must be combined to produce the final results queried for. Customers exist as an array of shapes and points that can be switched on the fly. Also, the present invention does not try to bypass the interaction between the customer and the vendor. It is instead aggregating the information of both parties in order to make finding the desired provider (and gauging the level of interested consumers) extremely efficient and simple. It permits a customer to offer or find something based on a location rather than an address (such as building a fence around a pasture half a mile away from the farm house) and the customer wants to know if that address-less area is serviced, the present invention can definitively provide that answer. Users of the present invention can log in as a GPS coordinate by clicking on a map. They can supply an address as a tool to position the map faster and even edit the location by dragging a marker on the map. It appears that Ashton et al.'s order-taking system on the other hand must have a correct address, which is then geocoded to use a geospatial query as a step to more efficiently eliminate non-qualifying vendors. Through the use of Quad Keys, it is possible to efficiently handle people that will define their shapes across boarders (inter provincial or even international). There can be very large areas defined along with very small areas and complex shapes mixed in with simple ones. This is where having the means to use both quad key and geospatial query options innovates over prior art. It allows the needs of each server to be dictated by the reality of the region it serves. Local shapes may reside in local servers and wide area shapes may reside in national servers while providing real time results to the user.

Compared to U.S. Pat. No. 5,991,739, the presently disclosed system allows a user to define multiple locations, allows users to define any size or shape of area that can be represented as a 2-d drawing, provides leads to vendors without requiring them to alter how they do business with their existing systems and provides two services operating in both directions. Consumers can easily locate vendors they want and customers can receive notification of products/services that interest them; Vendors can obtain new business automatically and vendors can survey for customers that would be interested in their products/services. The process is not over complicated, does not attempt to over use technology or take over any part of the vendor's business or limit the way a consumer interacts with a company they wish to do business with. The process includes a mechanism to limit data delivered to any party based on the request of other parties or based on criteria set as part of the process, and the system does not automate the purchasing or ordering process. The process manages contact information and makes it easy for clients to locate the businesses they want. Consumers have the means to facilitate an order through the system in the case of businesses that offer services by indicating they wish to use a specific vendor's service, but does not attempt to automate the order process. The Process relays the lead to the vendor (and the vendor's contact information to the client) and allows the parties to initiate their own communication.

Compared to U.S. Pat. No. 6,363,392, the presently disclosed system and process do not deal in unformatted information. The interface provides the tools to permit a user to provide properly formatted information and there is no mass importing of data. A map is used to adjust a location to ensure there is no misrepresentation of location information instead of methods less likely to guarantee a desired result. Lat./long. coordinates are used for spatial calculations because there can be no compromise in the location definition if the correct results are to be obtained.

Compared to U.S. Pat. No. 6,571,279, the presently disclosed system and process are tools for consumers to locate stores and services, location information is not obtained in real time and location information need not even match actual locations of users at the time of interface with the Process. Consumer profiles are overtly created and stored in the database by directly requesting shopping habits from consumers. They are not covertly built in an attempt to secretly determine what a user is willing to buy and what it will take to get the consumer to buy it. The user defines a location, locations or an area in order to determine what vendors they wish to use. Although there are provisions to have larger resources stored off the server, most of the computations and resources to be delivered to the users reside on the server(s).

Compared to U.S. Pat. No. 5,961,572 B2 the presently disclosed system and process provide a digital map that allows the user to identify their location directly, are designed to take multiple points and compare them to multiple shapes, and vice versa.

Compared to U.S. Pat. No. 6,868,410 B2 the presently disclosed system and process use a tool (digital map or "a transparent sensing area that is cross referenced and underlain with a digital map and can capture a user's 'click' as if the user was clicking on the map") that allows a user verify their location themselves, use point in rectangle methods to ensure process intensive calculations are only performed when absolutely required, can process multiple known points against multiple known shapes and vice versa. The invention's user interface collects the information and performs instant calculations to optimize the geographical data for an infinite number or geospatial evaluations. This is opposed to the prior art's geospatially processing locations at the time they are defined.

Compared to U.S. Pat. No. 6,701,307 the presently disclosed system and process do not create a database based on pre-existing records, do not "search" for spatial information but create an original database and provide spatial information in a way that subsequent searches will correctly and efficiently access it. Standard shapes are not used in many situations and exact "point in or point out" results are required, so no "compromise" is presented by using simple shapes as the final determining factor, even though simple shapes are used as early steps to eliminate undesired results more quickly. A database is built that users populate with information and that information is endowed with spatial properties. Other users later query that database with spatial criteria and possible other criteria (it may or may not be keywords, and may be items selected via a list, for example, a check box list). The present invention is not a search engine for the Internet, but a self contained system that receives and dispenses information.

Compared to US Patent Application Publication 2004/0133471 the presently disclosed system and process are different because they allow advertisers to define their geographic regions to be of any size. A more sophisticated "geospatial query" is provided.

Compared to U.S. Pat. No. 5,978,747 the presently disclosed system and process do not use a "zone in zone" feature at all.

Compared to US Patent Application Publication 2006/0155609 the presently disclosed system and process use specifically defined areas and locations, not simply zip codes, area codes or other predefined areas as a means to represent geographic information.

Compared to U.S. Pat. No. 7,403,939 the presently disclosed system and process have the locations explicitly defined and allow areas to be defined as custom areas that may or may not encompass one or more neighbourhoods, cities, postal/zip codes, etc. For example, a defined area can encompass part of one city and part of another city, but the defined area does not need to conform to neighbourhood areas within each city, zips or area codes or anything for that matter. The Geospatial Query deals in absolutes, accepting only expected and detailed criterion and always returns relevant results. The user interface includes a map to facilitate the defining of location information. Users of this invention are presented with definitive results because all information is compiled in a controlled manner, then formatted and indexed so that ambiguity or uncertainty is prevented when later queried. This is contrary to conforming items on the web that were established using a vastly wider range of standards, resulting in information that cannot be adequately distilled down to 100% accuracy through an automated process. A user presented with results of such a process is still forced to manually sift through inappropriate results that are included in error or results that the user would have wanted to see may be excluded in error.

Compared to U.S. Pat. No. 6,789,102 the presently disclosed system and process have query searches that are indifferent to the location of the terminal and do not incorporate vehicles.

Compared to U.S. Pat. No. 7,024,250 the presently disclosed system and process may use mobile devices, and may even use location sensitive mobile devices whose location at a particular point in time can be designated by a user as a location point for a geospatial query, but the geospatial query does not execute based on ongoing location updates from mobile devices.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of improving computer performance by identifying geospatial compatibility between consumers and providers of goods or services using a Best Guess Large Empty Rectangle (BGLER) in a system comprising a server accessible through a data network by electronic devices remote from said server, the method comprising:
   (a) providing access to the server through the data network by users including a set of first users each having a respective first electronic device and a set of second users each having a respective first electronic device, the first users and the second users being opposite ones of consumers and providers of goods or services;
   (b) (i) obtaining, by the system, of data on a respective geographic area associated with each one of said first users;
      (ii) obtaining, by the system, of data on a respective geographic location associated with each one of said second users; and
      (iii) obtaining, by the system, of information concerning at least one type of goods or services offered by each one of said providers of goods or services;
   (c) carrying out of calculations by the system using the data on the respective geographic location associated with said each one of said second users and the data on the respective geographic area associated with said each one of said first users to generate the Best Guess Large Empty Rectangle to automatically determine whether a coordinate point associated with the respective geographic location associated with said each one of said second users lies within the respective geographic area associated with said each one of said first users using the Best Guess Large Empty Rectangle; and, through said calculations, automatically identifying at least one match in the form of a geospatially compatible pair comprising a matched one of said first users and a matched one of said second users for which the respective geographic location specified by the matched one of said second users lies within the respective geographic area specified by the matched one of said first users; and
   (d) based on the data on the at least one type of goods or services offered by said each one of said providers of goods or services and the geospatially compatible pair identified in step (c), generating a list of available types of goods or services by the system, and causing display of said list to the consumer by the respective electronic device of the consumer.

2. The method of claim 1 wherein, in step (b), the system receives input indicating that said each one of said first users is a respective one of the providers and that the respective geographic area represents a service area served by said respective one of the providers, and also receives input indicating that said each one of said second users is a respective one of the consumers and that said respective one of the consumers is seeking a service to be provided at the respective geographic location.

3. The method of claim 1 wherein, in step (b), the system receives input indicating that said each one of said first users is a respective one of the consumers and that said respective one of the consumers is seeking merchandise within the respective geographic area, and also receives input indicating that said each one of said second users is a respective one of the providers and that said respective one of the providers is a merchant.

4. The method of claim 1 wherein, in step (b), the system receives input indicating that said each one of said first users is a respective one of the consumers and that said respective one of the consumers is seeking a service within the respective geographic area, and also receives input indicating that said each one of said second users is a respective one of the providers and that the respective geographic location represents a service location of said respective one of the providers.

5. The method of claim 1 wherein the respective geographic area of the matched one of said first users is a polygonal geographic area, and step (c) comprises (i) determining that the coordinate point associated with the respective geographic location associated with the matched one of said second users lies on or within an outer rectangle containing the vertices of the respective polygonal geographic area of the matched one of said first users, and then (ii) determining that said coordinate point lies on or within an inner rectangle contained within the respective polygonal geographic area of said matched one of said first users, thereby confirming that the coordinate point is located within the respective polygonal geographic area of said matched one of said first users, wherein said inner rectangle is the Best Guess Large Empty Rectangle.

6. The method of claim 1 wherein step (b)(i) comprises obtaining the data on the respective geographic area associated with at least one of said first users based on selection by said one of said first users of a plurality of coordinate points on a digital map displayed in a first user interface of the respective first electronic device of said one of said first users to mark vertices between lines marking a polygonal boundary of the respective geographic area of said one of said first users.

7. The method claim 6 wherein step (b)(ii) comprises obtaining the data on the respective geographic location associated with at least one of said second users based on selection by said one of said second users of the geographic location of said one of said second users on a second digital map displayed in a second user interface of the respective second electronic device of said one of said second users.

8. The method of claim 1 comprising storing of data by the system on more than a single geographic location or geographic area for at least one of the first and second users.

9. The method of claim 6 further comprising step (e) of updating of the data on the respective polygonal geographic area of said one of the first users by the system based on manipulation of the vertices of the respective polygonal geographic area by said one of the first users through the first user interface to cause a change in shape of the respective polygonal geographic area of said one of the first users, and wherein the method further comprises repetition of step (d) with the data from step (e), and generating of an updated version of the list by the system based on results from the repetition of step (d).

10. The method of claim 9 wherein the manipulation of the vertices comprises adding an additional vertex or removing or relocating an existing vertex.

11. The method of claim 1 comprising step (e) of, in response to selection of one of the available types of goods or services in the list by the consumer, the system provides said consumer access to contact information of a matching provider offering said one of the available types of goods or services.

12. The method of claim 11 wherein step (e) comprises providing the consumer access to the contact information of the provider subject to satisfaction of a fee payment criterion.

13. The method of claim 1 wherein step (b)(ii) comprises obtaining the data on the respective geographic location associated with at least one of said second users based on selection by said one of said second users of the geographic location of said one of said second users on a digital map displayed in a user interface of the respective second electronic device of said one of said second users, and the method further comprises:
step (e) of updating of the data on the respective geographic location of said one of the second users by the system based on editing of the respective geographic location by said one of the second users through repositioning of a point on the digital map; and
repetition of step (d) with the data from step (e), and generating of an updated version of the list by the system based on results from the repetition of step (d).

14. A system for improving computer performance by identifying geospatial compatibility between sets of first and second users, which are opposite ones of consumers and providers of goods or services, using a Best Guess Large Empty Rectangle (BGLER), the system comprising:
at least one server computer;
electronic devices remote from said at least one server computer;
a communications interface coupled with the at least one server computer for connecting to a data network that supports communication between the at least one server computer and the electronic devices remote therefrom; and
a computer readable medium coupled one or more processors of the system and having executable statements and instructions stored thereon for execution by the one or more processors to:
(a) (i) obtain data on a respective geographic area associated with each of the first users; and
(ii) obtain data on a respective geographic location associated with each of the second users; and
(iii) receive information concerning at least one type of goods or services offered by each one of said providers of goods or services;
(b) carry out calculations using the data on the respective geographic location associated with said each one of said second users and the data on the respective geographic area associated with said each one of said first users to generate the Best Guess Large Empty Rectangle to automatically determine whether a coordinate point of the respective geographic location associated with said each one of said second users lies within the respective geographic area associated with said each one of said first users using the Best Guess Large Empty Rectangle; and, through said calculations, automatically identify at least one match in the form of a geospatially compatible pair comprising a matched one of said first users and a matched one of said second users for which the respective geographic location associated with the matched one of said second users lies within the respective geographic area associated with the matched one of said first users; and
(c) based on the data on the at least one type of goods or services offered by said each one of said providers of goods or services and the geospatially compatible pair identified in step (b), generate output data on a list of available types of goods or services, and cause display of said list to the consumer by said respective electronic device.

15. The system of claim 14 wherein the statements and instructions on the computer readable memory are configured to, in step (a), accept input indicating that said each one of said first users is a respective one of the providers and that the respective geographic area represents a service area served by said respective one of the providers, and also accept input indicating that said each one of said second users is a respective one of the consumers and that said respective one of the consumers is seeking a service to be provided at the respective geographic location.

16. The system of claim 14 wherein the stored statements and instructions on the computer readable memory are configured to, in step (a), accept input indicating that said each one of said first users is a respective one of the consumers and that said respective one of the consumers is seeking merchandise within the respective geographic area, and also accept input indicating that said each one of said second users is a respective one of the providers and that said respective one of the providers is a merchant.

17. The system of claim 14 wherein the stored statements and instructions on the computer readable memory are configured to, in step (a), accept input indicating that said each one of said first users is a respective one of the consumers and that said respective one of the consumers is seeking a service, and also accept input indicating that said each one of said second users is a respective one of the providers and that the respective geographic location represents a service location of said respective one of the providers.

18. The system of claim 14 wherein the respective geographic area of the matched one of said first users is a polygonal geographic area, and wherein the stored statements and instructions on the computer readable memory are configured such that step (b) comprises (i) determining that the coordinate point associated with the respective geographic location associated with the matched one of said second users lies on or within an outer rectangle containing the vertices of the respective polygonal geographic area of the matched one of said first users, and then (ii) determining that said coordinate point lies on or within an inner rectangle contained within the respective polygonal geographic area of said matched one of said first users, thereby confirming that the coordinate point is located within the respective polygonal geographic area of said matched one of said first users, wherein said inner rectangle is the Best Guess Largest Empty Rectangle.

19. The system of claim 14 wherein the stored statements and instructions on the computer readable memory are configured such that step (a)(i) comprises obtaining the data on the respective geographic area associated with at least one of said first users based on selection by said one of said first users of a plurality of coordinate points on a digital map displayed in a first user interface of the respective first electronic device of said one of said first users to mark vertices between lines marking a polygonal boundary of the respective geographic area of said one of said first users.

20. The system of claim 19 wherein the stored statements and instructions on the computer readable memory are configured such that step (a)(ii) comprises obtaining the data on the respective geographic location associated with at least one of said second users based on selection by said one of said second users of the geographic location of said one of said second users on a second digital map displayed in a second user interface of the respective second electronic device of said one of said second users.

21. The system of claim 14 wherein the stored statements and instructions on the computer readable memory are configured to enable receipt and storage of more than a single geographic location or geographic area for at least one of the first and second users.

22. The system of claim 19 wherein the stored statements and instructions on the computer readable memory are configured to perform additional step (d) of updating the data on the respective geographic area of said one of the first users based on manipulation of the vertices of the respective geographic area by said one of the first users through the first user interface to cause a change in shape of the respective geographic area of said one of the first users, and then perform repetition of step (c) with the data from step (d), and generate an updated version of the list based on results from the repetition of step (c).

23. The system of claim 22 wherein the stored statements and instructions on the computer readable memory are configured to enable the enable addition of a new vertex and removal or relocation of an existing vertex in the manipulation of the vertices.

24. The system of claim 14 wherein the stored statements and instructions on the computer readable memory are configured to perform additional step (d) of, in response to selection of one of the available types of goods or services in the list by the consumer, providing said consumer access to contact information of a matching provider offering said one of the available types of goods or services.

25. The system of claim 23 wherein the stored statements and instructions on the computer readable memory are configured such that step (d) comprises providing the consumer access to the contact information of the provider subject to satisfaction of a fee payment criterion.

26. The system of claim 14 wherein the stored statements and instructions on the computer readable memory are configured such that:
step (a)(ii) comprises obtaining the data on the respective geographic location associated with at least one of said second users based on selection by said one of said second users of the geographic location of said one of said second users on a digital map displayed in a user interface of the respective second electronic device of said one of said second users;
additional step (d) is performed, and comprises updating of the data on the respective geographic location of said one of the second users based on editing of the respective geographic location by said one of the second users through repositioning of a point on the digital map; and
repetition of step (c) is then performed with the data from step (d) to generate an updated version of the list based on results said repetition of step (c).

27. A method of improving computer performance by identifying geospatial compatibility between consumers and providers of goods or services using a Best Guess Large Empty Rectangle (BGLER) in a system comprising a server accessible through a data network by electronic devices remote from said server, the method comprising:
  (a) providing access to the server through the data network by users including a plurality of consumers and a plurality of providers of goods or services, each of whom operates a respective one of said electronic devices;
  (b) (i) for at least a first group of said users, obtaining of data by the system on a geographic area for each user of said first group; and
    (ii) for at least a second group of said users, obtaining of data by the system on a geographic location for each user of said second group;
    (iii) for at least some users of the first and second groups, obtaining of data, by the system, on both a geographic location and a geographic area;
  (c) for each user of step (b)(iii), performing of point-in-area calculations, including generation of the Best Guess Large Empty Rectangle, by the system to determine, using said Best Guess Large Empty Rectangle, whether the geographic location of any other users from steps (b)(ii) and (b)(iii) falls within the geographic area of said each user of step (b)(iii) and whether the geographic location of said each user of step (b)(iii) falls within the geographic area of any other users from steps (b)(i) and (b)(iii); and through said calculations, automatically determining a first subset of said any other users from steps (b)(ii) and (b)(iii) whose geographic locations are located within the geographic area of one of the at least some users from step (b)(iii), and a second compatible subset of said any other users from steps (b)(i) and (b)(iii) whose geographic areas contain the geographic location of said one user from step (b)(iii); and
  (d) causing, by the system, display on the respective electronic device of said one of the at least some users from step (b)(iii) a first indication of geospatial compatibility of the first subset of said any other users from steps (b)(ii) and (b)(iii) in relation to the geographic area of said one of the at least some users from step (b)(iii);
  (e) causing, by the system, display on the respective electronic device of said one of the at least some users from step (b)(iii) a second indication of geospatial compatibility of the second subset of said any other users from steps (b)(i) and (b)(iii) in relation to the geographic location of said one of the at least some users from step (b)(iii).

28. The method of claim 6 wherein step (d) comprises receiving, by the system, of a first request from said one of the at least some users from step (b)(iii) for a first mode of output and causing display of the first indication in response to said first request, and step (e) comprises receiving, by the system, of a second request from said one of the at least some users from step (b)(iii) for a second mode of output and causing display of the second indication in response to said second request.

29. A system for improving computer performance by identifying geospatial compatibility between consumers and providers of goods or services using a Best Guess Large Empty Rectangle (BGLER), the system comprising:
  at least one server computer;
  electronic devices remote from said at least one server computer;
  a communications interface coupled with the at least one server computer for connecting to a data network that enables communication between the at least one server computer and the external electronic devices, which are respectively operated by remote users, said remote users including a plurality of consumers and a plurality of providers of goods or services;
  a computer readable medium coupled to one or processors of the system and having executable statements and instructions stored thereon for execution by the one or more processors to:
  (a) (i) for at least a first group of said remote users, obtain data on a geographic area for each user of said first group; and
    (ii) for at least a second group of said remote users, obtain data on a geographic location for each user of said second group;
    (iii) for at least some users of the first and second groups, obtain data on both a geographic location and a geographic area;
  (b) for said each of the at least some users in step (a)(iii), perform point-in-area calculations to generate the Best Guess Large Empty Rectangle and determine, using said Best Guess Large Empty Rectangle, whether the geographic location of any other users from the second group falls within the respective geographic area of said each of the least some users in step (a)(iii) and whether the geographic location of said each of the least some users in step (a)(iii) falls within the geographic area of any other users from the first group; and through said calculations, automatically determine whether there are any users of a first type whose geographic locations are located within the geographic area of said each of the least some users in step (a)(iii), and whether there are any users of a second type whose respective geographic areas contain the geographic location of said each of the least some users in step (a)(iii); and
  (c) subject to a positive determination of at least one user of the first or second type for at least one of the least some users from step (a)(iii), causing display on the electronic device of said at least one of the least some users from step (a)(iii) of an indication of a geospatial compatibility of each of said at least one user of the first or second type in relation to the geographic area or geographic location of said at least one of the least some users from step (a)(iii).

30. The system of claim 29 wherein the executable statements and instructions are configured such that:
  step (a)(i) comprises obtaining a first indication of whether said each user of said first group is a consumer or a provider of goods or services;
  step (a)(ii) comprises obtaining a second indication of whether said each user of said second group is a consumer or a provider of goods or services; and
  step (b) comprises confirming that said each of the at least some users in step (a)(iii) is a consumer based on said first or second indication, and identifying said any other users from the second group from among users in said second group who identified a provider of goods or services in in the second indication.

31. The system of claim 29 wherein the executable statements and instructions are configured such that:
  step (a)(i) comprises obtaining a first indication of whether said each user of said first group is a consumer or a provider of goods or services;
  step (a)(ii) comprises obtaining a second indication of whether said each user of said second group is a consumer or a provider of goods or services; and
  step (b) comprises confirming that said each of the at least some users in step (a)(iii) is a providers of goods or services based on said first or second indication, and identifying said any other users from the second group from among users in said second group who identified a consumer in in the second indication.

32. The system of claim 29 wherein the executable statements and instructions are configured such that:
  step (a)(i) comprises obtaining a first indication of whether said each user of said first group is a consumer or a provider of goods or services;
  step (a)(ii) comprises obtaining a second indication of whether said each user of said second group is a consumer or a provider of goods or services; and
  step (b) comprises confirming that said each of the at least some users in step (a)(iii) is a consumer based on said first or second indication, and identifying said any other users from the first group from among users in said first group who identified a provider of goods or services in in the first indication.

33. The system of claim 29 wherein the executable statements and instructions are configured such that:
  step (a)(i) comprises obtaining a first indication of whether said each user of said first group is a consumer or a provider of goods or services;
  step (a)(ii) comprises obtaining a second indication of whether said each user of said second group is a consumer or a provider of goods or services; and
  step (b) comprises confirming that said each of the at least some users in step (a)(iii) is a provider of goods or services based on said first or second indication, and identifying said any other users from the first group from among users in said first group who identified a consumer in in the first indication.

* * * * *